US010565998B2

(12) United States Patent
Wilberding

(10) Patent No.: US 10,565,998 B2
(45) **Date of Patent: *Feb. 18, 2020**

(54) PLAYBACK DEVICE SUPPORTING CONCURRENT VOICE ASSISTANT SERVICES

(71) Applicant: Sonos, Inc., Santa Barbara, CA (US)

(72) Inventor: Dayn Wilberding, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,437

(22) Filed: Jun. 11, 2019

(65) Prior Publication Data

US 2019/0295555 A1 Sep. 26, 2019

Related U.S. Application Data

(63) Continuation of application No. 16/173,797, filed on Oct. 29, 2018, now Pat. No. 10,354,658, which is a (Continued)

(51) Int. Cl.
*G10L 17/22* (2013.01)
*G06F 3/16* (2006.01)
(Continued)

(52) U.S. Cl.
CPC .............. *G10L 17/22* (2013.01); *G06F 3/167* (2013.01); *G10L 15/22* (2013.01); *G10L 15/30* (2013.01);
(Continued)

(58) Field of Classification Search
CPC ......... G10L 17/22; G10L 17/02; G10L 15/30; G10L 2015/088; H05B 37/02
(Continued)

(56) References Cited

U.S. PATENT DOCUMENTS 4,741,038 A 4/1988 Elko et al.
4,941,187 A 7/1990 Slater
(Continued)

FOREIGN PATENT DOCUMENTS

AU 2017100486 A4 6/2017
AU 2017100581 A4 6/2017
(Continued)

OTHER PUBLICATIONS

US 9,299,346 B1, 03/2016, Hart et al. (withdrawn)
(Continued)

*Primary Examiner* — Edwin S Leland, III
(74) *Attorney, Agent, or Firm* — McDonnell Boehnen Hulbert & Berghoff LLP

(57) ABSTRACT

Disclosed herein are example techniques to support multiple voice assistant services. An example implementation may involve a playback device continuously capturing, via the at least one microphone, audio into one or more buffers and analyzing the captured audio using a first wake-word detection algorithm and a second wake-word detection algorithm. When one of the first wake-word detection algorithm or the second wake-word detection algorithm detects, in the captured audio, a wake-word corresponding to a particular voice assistant service of (a) the first voice assistant service or (b) the second voice assistant service, the playback device transmits the captured audio to one or more servers associated with the particular voice assistant service. After transmitting the captured audio, the playback device receives, via the network interface, at least one instruction based on the captured audio; and performs one or more actions based on the at least one instruction.

20 Claims, 8 Drawing Sheets

900

START

RECEIVING INPUT DATA INDICATING COMMAND TO REGISTER VOICE SERVICE(S) ON SECOND DEVICE(S) — 902

DETECT VOICE SERVICE(S) THAT ARE REGISTERED TO FIRST DEVICE — 904

CAUSE REGISTRATION OF DECTECTED VOICE SERVICES ON SECOND DEVICE(S) — 906

END

Related U.S. Application Data continuation of application No. 15/229,868, filed on Aug. 5, 2016, now Pat. No. 10,115,400.

(51) Int. Cl.

| | |
|---|---|
| ***G10L 15/22*** | (2006.01) |
| ***G10L 15/30*** | (2013.01) |
| ***G10L 17/02*** | (2013.01) |
| ***H05B 37/02*** | (2006.01) |
| *G10L 15/08* | (2006.01) |

(52) U.S. Cl.

CPC .............. *G10L 17/02* (2013.01); *H05B 37/02* (2013.01); *G10L 2015/088* (2013.01); *G10L 2015/223* (2013.01)

(58) Field of Classification Search

USPC .......................................................... 704/275

See application file for complete search history.

(56) References Cited

U.S. PATENT DOCUMENTS 5,440,644 A 8/1995 Farinelli et al.
5,588,065 A 12/1996 Tanaka et al.
5,740,260 A 4/1998 Odom
5,761,320 A 6/1998 Farinelli et al.
5,923,902 A 7/1999 Inagaki
6,032,202 A 2/2000 Lea et al.
6,088,459 A 7/2000 Hobelsberger
6,256,554 B1 7/2001 DiLorenzo
6,301,603 B1 10/2001 Maher et al.
6,311,157 B1 10/2001 Strong
6,404,811 B1 6/2002 Cvetko et al.
6,408,078 B1 6/2002 Hobelsberger
6,469,633 B1 10/2002 Wachter et al.
6,522,886 B1 2/2003 Youngs et al.
6,594,347 B1 7/2003 Calder et al.
6,594,630 B1 7/2003 Zlokarnik et al.
6,611,537 B1 8/2003 Edens et al.
6,611,604 B1 8/2003 Irby et al.
6,631,410 B1 10/2003 Kowalski et al.
6,757,517 B2 6/2004 Chang et al.
6,778,869 B2 8/2004 Champion
7,130,608 B2 10/2006 Hollstrom et al.
7,130,616 B2 10/2006 Janik
7,143,939 B2 12/2006 Henzerling
7,236,773 B2 6/2007 Thomas
7,295,548 B2 11/2007 Blank et al.
7,391,791 B2 6/2008 Balassanian et al.
7,483,538 B2 1/2009 McCarty et al.
7,571,014 B1 8/2009 Lambourne et al.
7,630,501 B2 12/2009 Blank et al.
7,643,894 B2 1/2010 Braithwaite et al.
7,657,910 B1 2/2010 McAulay et al.
7,661,107 B1 2/2010 Van Dyke et al.
7,702,508 B2 4/2010 Bennett
7,792,311 B1 9/2010 Holmgren et al.
7,853,341 B2 12/2010 McCarty et al.
7,961,892 B2 6/2011 Fedigan
7,987,294 B2 7/2011 Bryce et al.
8,014,423 B2 9/2011 Thaler et al.
8,032,383 B1 10/2011 Bhardwaj et al.
8,041,565 B1 10/2011 Bhardwaj et al.
8,045,952 B2 10/2011 Qureshey et al.
8,073,125 B2 12/2011 Zhang et al.
8,103,009 B2 1/2012 McCarty et al.
8,234,395 B2 7/2012 Millington et al.
8,239,206 B1 8/2012 Lebeau et al.
8,255,224 B2 8/2012 Singleton et al.
8,284,982 B2 10/2012 Bailey
8,290,603 B1 10/2012 Lambourne et al.
8,340,975 B1 12/2012 Rosenberger et al.
8,364,481 B2 1/2013 Strope et al.
8,385,557 B2 2/2013 Tashev et al.
8,386,261 B2 2/2013 Mellott et al.
8,423,893 B2 4/2013 Ramsay et al.
8,428,758 B2 4/2013 Naik et al.
8,453,058 B1 5/2013 Coccaro et al.
8,473,618 B2 * 6/2013 Spear ................. H04L 65/1066 709/227
8,483,853 B1 7/2013 Lambourne et al.
8,484,025 B1 7/2013 Moreno Mengibar et al.
8,831,761 B2 9/2014 Kemp et al.
8,831,957 B2 9/2014 Taubman et al.
8,874,448 B1 10/2014 Kauffmann et al.
8,938,394 B1 1/2015 Faaborg et al.
8,942,252 B2 1/2015 Balassanian et al.
8,983,383 B1 3/2015 Haskin
8,983,844 B1 3/2015 Thomas et al.
9,042,556 B2 5/2015 Kallai et al.
9,094,539 B1 7/2015 Noble
9,215,545 B2 12/2015 Dublin et al.
9,251,793 B2 2/2016 Lebeau et al.
9,253,572 B2 2/2016 Bedingfield, Sr. et al.
9,262,612 B2 2/2016 Cheyer
9,288,597 B2 3/2016 Carlsson et al.
9,300,266 B2 3/2016 Grokop
9,307,321 B1 4/2016 Unruh
9,318,107 B1 4/2016 Sharifi
9,319,816 B1 4/2016 Narayanan
9,324,322 B1 4/2016 Torok et al.
9,335,819 B1 5/2016 Jaeger et al.
9,361,878 B2 6/2016 Boukadakis
9,368,105 B1 6/2016 Freed et al.
9,374,634 B2 6/2016 Macours
9,386,154 B2 7/2016 Baciu et al.
9,412,392 B2 8/2016 Lindahl et al.
9,426,567 B2 8/2016 Lee et al.
9,431,021 B1 8/2016 Scalise et al.
9,443,527 B1 9/2016 Watanabe et al.
9,472,201 B1 10/2016 Sleator
9,472,203 B1 10/2016 Ayrapetian et al.
9,484,030 B1 11/2016 Meaney et al.
9,489,948 B1 11/2016 Chu et al.
9,494,683 B1 11/2016 Sadek
9,509,269 B1 11/2016 Rosenberg
9,510,101 B1 11/2016 Polleros
9,514,752 B2 12/2016 Sharifi
9,536,541 B2 1/2017 Chen et al.
9,548,053 B1 1/2017 Basye et al.
9,548,066 B2 1/2017 Jain et al.
9,552,816 B2 1/2017 Vanlund et al.
9,560,441 B1 1/2017 McDonough, Jr.
9,576,591 B2 2/2017 Kim et al.
9,601,116 B2 3/2017 Melendo Casado et al.
9,615,170 B2 4/2017 Kirsch et al.
9,615,171 B1 4/2017 O'Neill et al.
9,626,695 B2 4/2017 Balasubramanian et al.
9,632,748 B2 4/2017 Faaborg et al.
9,633,186 B2 4/2017 Ingrassia, Jr. et al.
9,633,368 B2 4/2017 Greenzeiger et al.
9,633,660 B2 4/2017 Haughay et al.
9,633,671 B2 4/2017 Giacobello et al.
9,633,674 B2 4/2017 Sinha et al.
9,640,179 B1 5/2017 Hart et al.
9,640,183 B2 5/2017 Jung et al.
9,641,919 B1 5/2017 Poole et al.
9,646,614 B2 5/2017 Bellegarda et al.
9,653,060 B1 5/2017 Hilmes et al.
9,653,075 B1 5/2017 Chen et al.
9,659,555 B1 5/2017 Hilmes et al.
9,672,821 B2 6/2017 Krishnaswamy et al.
9,685,171 B1 6/2017 Yang
9,691,378 B1 6/2017 Meyers et al.
9,691,379 B1 6/2017 Mathias et al.
9,697,826 B2 7/2017 Sainath et al.
9,697,828 B1 7/2017 Prasad et al.
9,698,999 B2 7/2017 Mutagi et al.
9,704,478 B1 7/2017 Vitaladevuni et al.
9,721,566 B2 8/2017 Newendorp et al.
9,721,568 B1 8/2017 Polansky et al.
9,721,570 B1 8/2017 Beal et al.
9,728,188 B1 8/2017 Rosen et al.

(56) References Cited

U.S. PATENT DOCUMENTS 9,734,822 B1 8/2017 Sundaram et al.
9,747,011 B2 8/2017 Lewis et al.
9,747,899 B2 8/2017 Pogue et al.
9,747,920 B2 8/2017 Ayrapetian et al.
9,747,926 B2 8/2017 Sharifi et al.
9,754,605 B1 9/2017 Chhetri
9,762,967 B2 9/2017 Clarke et al.
9,811,314 B2 11/2017 Plagge et al.
9,813,810 B1 11/2017 Nongpiur
9,813,812 B2 11/2017 Berthelsen et al.
9,820,036 B1 11/2017 Tritschler et al.
9,820,039 B2 11/2017 Lang
9,826,306 B2 11/2017 Lang
9,865,259 B1 1/2018 Typrin et al.
9,865,264 B2* 1/2018 Gelfenbeyn ............ G10L 15/32
9,881,616 B2 1/2018 Beckley et al.
9,916,839 B1 3/2018 Scalise et al.
9,947,316 B2 4/2018 Millington et al.
9,973,849 B1 5/2018 Zhang et al.
10,013,995 B1 7/2018 Lashkari et al.
10,048,930 B1 8/2018 Vega et al.
10,051,366 B1 8/2018 Buoni et al.
10,079,015 B1 9/2018 Lockhart et al.
10,134,399 B2 11/2018 Lang et al.
10,152,969 B2 12/2018 Reilly et al.
2001/0042107 A1 11/2001 Palm
2002/0022453 A1 2/2002 Balog et al.
2002/0026442 A1 2/2002 Lipscomb et al.
2002/0034280 A1 3/2002 Infosino
2002/0072816 A1 6/2002 Shdema et al.
2002/0124097 A1 9/2002 Isely et al.
2003/0040908 A1 2/2003 Yang et al.
2003/0070869 A1 4/2003 Hlibowicki
2003/0072462 A1 4/2003 Hlibowicki
2003/0095672 A1 5/2003 Hobelsberger
2003/0157951 A1 8/2003 Hasty
2004/0024478 A1 2/2004 Hans et al.
2004/0093219 A1* 5/2004 Shin ...................... B25J 9/0003
704/275
2004/0128135 A1 7/2004 Anastasakos et al.
2005/0031131 A1 2/2005 Browning et al.
2005/0031132 A1 2/2005 Browning et al.
2005/0031133 A1 2/2005 Browning et al.
2005/0031134 A1 2/2005 Leske
2005/0031137 A1 2/2005 Browning et al.
2005/0031138 A1 2/2005 Browning et al.
2005/0031139 A1 2/2005 Browning et al.
2005/0031140 A1 2/2005 Browning
2005/0047606 A1 3/2005 Lee et al.
2005/0077843 A1 4/2005 Benditt
2005/0164664 A1 7/2005 DiFonzo et al.
2005/0195988 A1 9/2005 Tashev et al.
2005/0207584 A1 9/2005 Bright
2005/0268234 A1 12/2005 Rossi, Jr. et al.
2005/0283330 A1 12/2005 Laraia et al.
2006/0104451 A1 5/2006 Browning et al.
2006/0147058 A1 7/2006 Wang
2006/0190269 A1 8/2006 Tessel et al.
2006/0190968 A1 8/2006 Jung et al.
2006/0247913 A1 11/2006 Huerta et al.
2006/0262943 A1 11/2006 Oxford
2007/0018844 A1 1/2007 Sutardja
2007/0019815 A1 1/2007 Asada et al.
2007/0033043 A1* 2/2007 Hyakumoto ....... G01C 21/3608
704/255
2007/0071255 A1 3/2007 Schobben
2007/0076131 A1 4/2007 Li et al.
2007/0076906 A1 4/2007 Takagi et al.
2007/0140058 A1 6/2007 McIntosh et al.
2007/0140521 A1 6/2007 Mitobe et al.
2007/0142944 A1 6/2007 Goldberg et al.
2007/0147651 A1 6/2007 Mitobe et al.
2008/0037814 A1 2/2008 Shau
2008/0090537 A1 4/2008 Sutardja
2008/0146289 A1 6/2008 Korneluk et al.
2008/0221897 A1* 9/2008 Cerra ...................... G10L 15/30
704/270.1
2008/0247530 A1 10/2008 Barton et al.
2008/0248797 A1 10/2008 Freeman et al.
2008/0301729 A1 12/2008 Broos et al.
2009/0003620 A1 1/2009 McKillop et al.
2009/0005893 A1 1/2009 Sugii et al.
2009/0010445 A1 1/2009 Matsuo et al.
2009/0018828 A1 1/2009 Nakadai et al.
2009/0076821 A1 3/2009 Brenner et al.
2009/0153289 A1 6/2009 Hope et al.
2009/0197524 A1 8/2009 Haff et al.
2009/0228919 A1 9/2009 Zott et al.
2009/0238377 A1 9/2009 Ramakrishnan et al.
2009/0248397 A1 10/2009 Garcia et al.
2009/0264072 A1 10/2009 Dai
2009/0326949 A1 12/2009 Douthitt et al.
2010/0014690 A1 1/2010 Wolff et al.
2010/0023638 A1 1/2010 Bowman
2010/0035593 A1 2/2010 Franco et al.
2010/0075723 A1 3/2010 Min et al.
2010/0092004 A1 4/2010 Kuze
2010/0172516 A1 7/2010 Lastrucci
2010/0179874 A1 7/2010 Higgins et al.
2010/0211199 A1 8/2010 Naik et al.
2011/0033059 A1 2/2011 Bhaskar et al.
2011/0035580 A1 2/2011 Wang et al.
2011/0044461 A1 2/2011 Kuech et al.
2011/0044489 A1 2/2011 Saiki et al.
2011/0091055 A1 4/2011 Leblanc
2011/0145581 A1 6/2011 Malhotra et al.
2011/0182436 A1 7/2011 Murgia et al.
2011/0267985 A1* 11/2011 Wilkinson .......... H04M 1/2535
370/259
2011/0276333 A1 11/2011 Wang et al.
2011/0280422 A1 11/2011 Neumeyer et al.
2011/0289506 A1 11/2011 Trivi et al.
2011/0299706 A1 12/2011 Sakai
2012/0020486 A1 1/2012 Fried et al.
2012/0022863 A1 1/2012 Cho et al.
2012/0022864 A1 1/2012 Leman et al.
2012/0078635 A1* 3/2012 Rothkopf ................ G10L 15/30
704/270.1
2012/0123268 A1 5/2012 Tanaka et al.
2012/0131125 A1 5/2012 Seidel et al.
2012/0148075 A1 6/2012 Goh et al.
2012/0163603 A1 6/2012 Abe et al.
2012/0177215 A1 7/2012 Bose et al.
2012/0297284 A1 11/2012 Matthews, III et al.
2012/0308044 A1 12/2012 Vander Mey et al.
2012/0308046 A1 12/2012 Muza
2013/0006453 A1 1/2013 Wang et al.
2013/0024018 A1 1/2013 Chang et al.
2013/0039527 A1 2/2013 Jensen et al.
2013/0058492 A1 3/2013 Silzle et al.
2013/0066453 A1 3/2013 Seefeldt et al.
2013/0080146 A1* 3/2013 Kato ..................... G10L 15/005
704/2
2013/0124211 A1 5/2013 McDonough
2013/0148821 A1 6/2013 Sorensen
2013/0179173 A1 7/2013 Lee et al.
2013/0183944 A1 7/2013 Mozer et al.
2013/0191122 A1 7/2013 Mason
2013/0198298 A1 8/2013 Li et al.
2013/0216056 A1 8/2013 Thyssen
2013/0315420 A1 11/2013 You
2013/0317635 A1 11/2013 Bates et al.
2013/0322665 A1 12/2013 Bennett et al.
2013/0324031 A1 12/2013 Loureiro
2013/0329896 A1 12/2013 Krishnaswamy et al.
2013/0331970 A1 12/2013 Beckhardt et al.
2013/0332165 A1 12/2013 Beckley et al.
2013/0343567 A1 12/2013 Triplett et al.
2014/0003611 A1 1/2014 Mohammad et al.
2014/0003625 A1 1/2014 Sheen et al.
2014/0003635 A1 1/2014 Mohammad et al.
2014/0006026 A1 1/2014 Lamb et al.
2014/0034929 A1 2/2014 Hamada et al.
2014/0064501 A1 3/2014 Olsen et al.

(56) References Cited

U.S. PATENT DOCUMENTS

2014/0075306 A1 3/2014 Rega
2014/0094151 A1 4/2014 Klappert et al.
2014/0100854 A1 4/2014 Chen et al.
2014/0122075 A1 5/2014 Bak et al.
2014/0145168 A1 5/2014 Ohsawa et al.
2014/0146983 A1 5/2014 Kim et al.
2014/0164400 A1 6/2014 Kruglick
2014/0167931 A1 6/2014 Lee et al.
2014/0168344 A1 6/2014 Shoemake et al.
2014/0195252 A1 7/2014 Gruber et al.
2014/0219472 A1 8/2014 Huang et al.
2014/0222436 A1 8/2014 Binder et al.
2014/0244013 A1 8/2014 Reilly
2014/0244712 A1 8/2014 Walters et al.
2014/0249817 A1 9/2014 Hart et al.
2014/0252386 A1 9/2014 Ito et al.
2014/0254805 A1 9/2014 Su et al.
2014/0258292 A1 9/2014 Thramann et al.
2014/0259075 A1 9/2014 Chang et al.
2014/0270282 A1 9/2014 Tammi et al.
2014/0274185 A1 9/2014 Luna et al.
2014/0274203 A1 9/2014 Ganong, III et al.
2014/0274218 A1 9/2014 Kadiwala et al.
2014/0277650 A1 9/2014 Zurek et al.
2014/0291642 A1 10/2014 Watabe et al.
2014/0310002 A1 10/2014 Nitz et al.
2014/0340888 A1 11/2014 Ishisone et al.
2014/0357248 A1 12/2014 Tonshal et al.
2014/0363022 A1 12/2014 Dizon et al.
2014/0365227 A1 12/2014 Cash et al.
2014/0369491 A1 12/2014 Kloberdans et al.
2014/0372109 A1 12/2014 Iyer et al.
2015/0006176 A1 1/2015 Pogue et al.
2015/0010169 A1 1/2015 Popova et al.
2015/0014680 A1 1/2015 Yamazaki et al.
2015/0016642 A1 1/2015 Walsh et al.
2015/0019201 A1 1/2015 Schoenbach
2015/0036831 A1 2/2015 Klippel
2015/0063580 A1 3/2015 Huang et al.
2015/0086034 A1 3/2015 Lombardi et al.
2015/0104037 A1 4/2015 Lee et al.
2015/0106085 A1 4/2015 Lindahl
2015/0110294 A1 4/2015 Chen et al.
2015/0112672 A1 4/2015 Giacobello et al.
2015/0154976 A1 6/2015 Mutagi
2015/0169279 A1 6/2015 Duga
2015/0170645 A1 6/2015 Di Censo et al.
2015/0180432 A1 6/2015 Gao et al.
2015/0181318 A1 6/2015 Gautama et al.
2015/0189438 A1 7/2015 Hampiholi et al.
2015/0200454 A1 7/2015 Heusdens et al.
2015/0221678 A1 8/2015 Yamazaki et al.
2015/0222987 A1 8/2015 Angel, Jr. et al.
2015/0228274 A1 8/2015 Leppänen et al.
2015/0228803 A1 8/2015 Koezuka et al.
2015/0237406 A1 8/2015 Ochoa et al.
2015/0249889 A1 9/2015 Iyer et al.
2015/0253292 A1 9/2015 Larkin et al.
2015/0253960 A1 9/2015 Lin et al.
2015/0263174 A1 9/2015 Yamazaki et al.
2015/0271593 A1 9/2015 Sun et al.
2015/0277846 A1 10/2015 Yen et al.
2015/0280676 A1 10/2015 Holman et al.
2015/0296299 A1 10/2015 Klippel et al.
2015/0302856 A1 10/2015 Kim et al.
2015/0319529 A1 11/2015 Klippel
2015/0338917 A1 11/2015 Steiner et al.
2015/0341406 A1 11/2015 Rockefeller et al.
2015/0346845 A1 12/2015 Di Censo et al.
2015/0348551 A1 12/2015 Gruber et al.
2015/0363061 A1 12/2015 De Nigris, III et al.
2015/0363401 A1 12/2015 Chen et al.
2015/0371657 A1 12/2015 Gao et al.
2015/0371664 A1 12/2015 Bar-Or et al.
2015/0380010 A1 12/2015 Srinivasan et al.
2016/0007116 A1 1/2016 Holman
2016/0021458 A1 1/2016 Johnson et al.
2016/0029142 A1 1/2016 Isaac et al.
2016/0035321 A1 2/2016 Cho et al.
2016/0036962 A1 2/2016 Rand et al.
2016/0042748 A1 2/2016 Jain et al.
2016/0044151 A1 2/2016 Shoemaker et al.
2016/0057522 A1 2/2016 Choisel et al.
2016/0077710 A1 3/2016 Lewis et al.
2016/0088036 A1 3/2016 Corbin et al.
2016/0088392 A1 3/2016 Huttunen et al.
2016/0093304 A1 3/2016 Kim et al.
2016/0094917 A1 3/2016 Wilk et al.
2016/0098393 A1 4/2016 Hebert
2016/0098992 A1 4/2016 Renard et al.
2016/0103653 A1 4/2016 Jang
2016/0111110 A1 4/2016 Gautama et al.
2016/0134982 A1 5/2016 Iyer
2016/0155442 A1 6/2016 Kannan et al.
2016/0155443 A1 6/2016 Khan et al.
2016/0157035 A1 6/2016 Russell et al.
2016/0162469 A1 6/2016 Santos
2016/0173578 A1 6/2016 Sharma et al.
2016/0173983 A1 6/2016 Berthelsen et al.
2016/0180853 A1 6/2016 Vanlund et al.
2016/0189716 A1 6/2016 Lindahl et al.
2016/0196499 A1 7/2016 Khan et al.
2016/0203331 A1 7/2016 Khan et al.
2016/0212538 A1 7/2016 Fullam et al.
2016/0225385 A1 8/2016 Hammarqvist
2016/0232451 A1 8/2016 Scherzer
2016/0234204 A1 8/2016 Rishi et al.
2016/0239255 A1 8/2016 Chavez et al.
2016/0260431 A1 9/2016 Newendorp et al.
2016/0302018 A1 10/2016 Russell et al.
2016/0314782 A1 10/2016 Klimanis
2016/0336519 A1 11/2016 Seo et al.
2016/0343866 A1 11/2016 Koezuka et al.
2016/0343949 A1 11/2016 Seo et al.
2016/0343954 A1 11/2016 Seo et al.
2016/0345114 A1 11/2016 Hanna et al.
2016/0352915 A1 12/2016 Gautama
2016/0353218 A1 12/2016 Starobin et al.
2016/0366515 A1 12/2016 Mendes et al.
2016/0372688 A1 12/2016 Seo et al.
2016/0373269 A1 12/2016 Okubo et al.
2016/0373909 A1 12/2016 Rasmussen et al.
2016/0379634 A1* 12/2016 Yamamoto .............. G10L 15/22
704/251
2017/0003931 A1 1/2017 Dvortsov et al.
2017/0012207 A1 1/2017 Seo et al.
2017/0012232 A1 1/2017 Kataishi et al.
2017/0019732 A1 1/2017 Mendes et al.
2017/0025615 A1 1/2017 Seo et al.
2017/0025630 A1 1/2017 Seo et al.
2017/0026769 A1 1/2017 Patel
2017/0039025 A1 2/2017 Kielak
2017/0060526 A1 3/2017 Barton et al.
2017/0062734 A1 3/2017 Suzuki et al.
2017/0070478 A1 3/2017 Park et al.
2017/0076720 A1 3/2017 Gopalan et al.
2017/0078824 A1 3/2017 Heo
2017/0083285 A1 3/2017 Meyers et al.
2017/0084292 A1 3/2017 Yoo
2017/0090864 A1 3/2017 Jorgovanovic
2017/0092278 A1 3/2017 Evermann et al.
2017/0092297 A1 3/2017 Sainath et al.
2017/0092889 A1 3/2017 Seo et al.
2017/0092890 A1 3/2017 Seo et al.
2017/0103754 A1 4/2017 Higbie et al.
2017/0103755 A1 4/2017 Jeon et al.
2017/0110124 A1 4/2017 Boesen et al.
2017/0110144 A1 4/2017 Sharifi et al.
2017/0117497 A1 4/2017 Seo et al.
2017/0123251 A1 5/2017 Nakada et al.
2017/0125037 A1 5/2017 Shin
2017/0125456 A1 5/2017 Kasahara
2017/0139720 A1 5/2017 Stein
2017/0140748 A1 5/2017 Roberts et al.

(56) References Cited

U.S. PATENT DOCUMENTS

2017/0140759 A1* 5/2017 Kumar .................... G10L 15/32
2017/0177585 A1 6/2017 Rodger et al.
2017/0178662 A1 6/2017 Ayrapetian et al.
2017/0188150 A1 6/2017 Brunet et al.
2017/0193999 A1 7/2017 Aleksic et al.
2017/0206896 A1 7/2017 Ko et al.
2017/0214996 A1 7/2017 Yeo
2017/0236512 A1 8/2017 Williams et al.
2017/0236515 A1 8/2017 Pinsky et al.
2017/0242651 A1 8/2017 Lang et al.
2017/0242653 A1* 8/2017 Lang ....................... H04S 7/301
2017/0243576 A1 8/2017 Millington et al.
2017/0243587 A1* 8/2017 Plagge .............. H04L 12/40052
2017/0245076 A1* 8/2017 Kusano .................... H04R 3/00
2017/0257686 A1 9/2017 Gautama et al.
2017/0270919 A1* 9/2017 Parthasarathi .......... G10L 15/20
2017/0287485 A1 10/2017 Civelli et al.
2017/0353789 A1 12/2017 Kim et al.
2018/0033428 A1 2/2018 Kim et al.
2018/0040324 A1* 2/2018 Wilberding ............. G10L 15/30
2018/0047394 A1 2/2018 Tian et al.
2018/0062871 A1 3/2018 Jones et al.
2018/0091913 A1* 3/2018 Hartung ............... H04R 29/007
2018/0130469 A1 5/2018 Gruenstein et al.
2018/0137861 A1 5/2018 Ogawa et al.
2018/0210698 A1 7/2018 Park et al.
2018/0233136 A1 8/2018 Torok et al.
2018/0277113 A1* 9/2018 Hartung .................. G10L 15/22
2019/0043492 A1 2/2019 Lang
2019/0074025 A1 3/2019 Lashkari et al.
2019/0079721 A1 3/2019 Vega et al.
2019/0098400 A1 3/2019 Buoni et al.
2019/0108839 A1* 4/2019 Reilly ..................... G10L 15/02
2019/0130906 A1* 5/2019 Kobayashi .............. G10L 15/22
2019/0172452 A1* 6/2019 Smith ..................... G10L 15/22

FOREIGN PATENT DOCUMENTS

CN 103546616 A 1/2014
CN 105284076 A 1/2016
EP 1349146 A1 10/2003
EP 1389853 A1 2/2004
EP 2683147 A1 1/2014
EP 2351021 B1 9/2017
JP 2001236093 A 8/2001
JP 2004347943 A 12/2004
JP 2004354721 A 12/2004
JP 2005284492 A 10/2005
JP 2008079256 A 4/2008
JP 2008158868 A 7/2008
JP 2010141748 A 6/2010
JP 2013037148 A 2/2013
JP 2014071138 A 4/2014
JP 2014137590 A 7/2014
KR 20100111071 A 10/2010
WO 200153994 7/2001
WO 2003093950 A2 11/2003
WO 2015037396 A1 3/2015
WO 2015178950 A1 11/2015
WO 2016014142 A1 1/2016
WO 2016022926 A1 2/2016
WO 2016033364 A1 3/2016
WO 2016057268 A1 4/2016
WO 2017039632 A1 3/2017

OTHER PUBLICATIONS

Restriction Requirement dated Aug. 9, 2018, issued in connection with U.S. Appl. No. 15/717,621, filed Sep. 27, 2017, 8 pages.

Souden et al. "An Integrated Solution for Online Multichannel Noise Tracking and Reduction." IEEE Transactions on Audio, Speech, and Language Processing, vol. 19. No. 7, Sep. 7, 2011, 11 pages.

Souden et al. "Gaussian Model-Based Multichannel Speech Presence Probability" IEEE Transactions on Audio, Speech, and Language Processing, vol. 18, No. 5, Jul. 5, 2010, 6pages.

Souden et al. "On Optimal Frequency-Domain Multichannel Linear Filtering for Noise Reduction." IEEE Transactions on Audio, Speech, and Language Processing, vol. 18, No. 2, Feb. 2010, 17pages.

Steven J. Nowlan and Geoffrey E. Hinton "Simplifying Neural Networks by Soft Weight-Sharing" Neural Computation 4, 1992, 21 pages.

Tsiami et al. "Experiments in acoustic source localization using sparse arrays in adverse indoors environments", 2014 22nd European Signal Processing Conference, Sep. 1, 2014, 5 pages.

Tweet: "How to start using Google app voice commands to make your life easier Share This Story shop @Bullet", Jan. 21, 2016, https://bgr.com/2016/01/21/best-ok-google-voice-commands/, 3 page.

Ullrich et al. "Soft Weight-Sharing for Neural Network Compression." ICLR 2017, 16 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Vacher at al. "Recognition of voice commands by multisource ASR and noise cancellation in a smart home environment" Signal Processing Conference 2012 Proceedings of the 20th European, IEEE, Aug. 27, 2012, 5 pages.

Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.

"S Voice or Google Now?"; https://web.archive.org/web/20160807040123/lowdown.carphonewarehouse.com/news/s-voice-or-google-now/ . . . , Apr. 28, 2015; 4 pages.

Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.

Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

International Searching Authority, International Search Report and Written Opinion dated Oct. 24, 2017, issued in connection with International Application No. PCT/US2017/042227, filed on Jul. 14, 2017, 16 pages.

International Searching Authority, International Search Report and Written Opinion dated Oct. 23, 2017, issued in connection with International Application No. PCT/US2017/042170, filed on Jul. 14, 2017, 15 pages.

International Searching Authority, International Search Report and Written Opinion dated May 23, 2017, issued in connection with International Application No. PCT/US2017/018739, Filed on Feb. 21, 2017, 10 pages.

International Searching Authority, International Search Report and Written Opinion dated Jan. 23, 2018, issued in connection with International Application No. PCT/US2017/57220, filed on Oct. 18, 2017, 8 pages.

International Searching Authority, International Search Report and Written Opinion dated Nov. 22, 2017, issued in connection with International Application No. PCT/US2017/054063, filed on Sep. 28, 2017, 11 pages.

International Searching Authority, International Search Report and Written Opinion dated Dec. 19, 2018, in connection with International Application No. PCT/US2018/053517, 13 pages.

(56) References Cited

OTHER PUBLICATIONS

International Bureau, International Preliminary Report on Patentability, dated Sep. 7, 2018, issued in connection with International Application No. PCT/US2017/018739, filed on Feb. 21, 2017, 7 pages.
International Bureau, International Preliminary Report on Patentability, dated Sep. 7, 2018, issued in connection with International Application No. PCT/US2017/018728, filed on Feb. 21, 2017, 8 pages.
International Bureau, International Preliminary Report on Patentability, dated Apr. 23, 2019, issued in connection with International Application No. PCT/US2017/057220, filed on Oct. 18, 2017, 7 pages.
International Bureau, International Preliminary Report on Patentability, dated Apr. 11, 2019, issued in connection with International Application No. PCT/US2017/0054063, filed on Sep. 28, 2017, 9 pages.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
Helwani et al "Source-domain adaptive filtering for MIMO systems with application to acoustic echo cancellation", Acoustics Speech and Signal Processing, 2010 IEEE International Conference, Mar. 14, 2010, 4 pages.
Han et al. "Deep Compression: Compressing Deep Neural Networks with Pruning, Trained Quantization and Huffman Coding." ICLR 2016, Feb. 15, 2016, 14 pages.
Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Freiberger, Karl, "Development and Evaluation of Source Localization Algorithms for Coincident Microphone Arrays," Diploma Thesis, Apr. 1, 2010, 106 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
Final Office Action dated Feb. 5, 2019, issued in connection with U.S. Appl. No. 15/438,749, filed Feb. 21, 2017, 17 pages.
Final Office Action dated Apr. 30, 2019, issued in connection with U.S. Appl. No. 15/098,760, filed Apr. 14, 2016, 6 pages.
Final Office Action dated Apr. 26, 2019, issued in connection with U.S. Appl. No. 15/721,141, filed Sep. 29, 2017, 20 pages.
Final Office Action dated Feb. 21, 2018, issued in connection with U.S. Appl. No. 15/297,627, filed Oct. 19, 2016, 12 pages.
Final Office Action dated Oct. 16, 2018, issued in connection with U.S. Appl. No. 15/438,725, filed Feb. 21, 2017, 10 pages.
Final Office Action dated Oct. 15, 2018, issued in connection with U.S. Appl. No. 15/804,776, filed Nov. 6, 2017, 18 pages.
Final Office Action dated Jun. 15, 2017, issued in connection with U.S. Appl. No. 15/098,718, filed Apr. 14, 2016, 15 pages.
Final Office Action dated Apr. 13, 2018, issued in connection with U.S. Appl. No. 15/438,744, filed Feb. 21, 2017, 20 pages.
Final Office Action dated Apr. 13, 2018, issued in connection with U.S. Appl. No. 15/131,254, filed Apr. 18, 2016, 18 pages.
Final Office Action dated Aug. 11, 2017, issued in connection with U.S. Appl. No. 15/131,776, filed Apr. 18, 2016, 7 pages.
Final Office Action dated Apr. 11, 2019, issued in connection with U.S. Appl. No. 15/131,254, filed Apr. 18, 2016, 17 pages.
Final Office Action dated Oct. 6, 2017, issued in connection with U.S. Appl. No. 15/098,760, filed Apr. 14, 2016, 25 pages.
Fadilpasic,"Cortana can now be the default PDA on your Android", IT Pro Portal: Accessed via WayBack Machine; http://web.archive.org/web/20171129124915/https://www.itproportal.com/2015/08/11/cortana-can-now-be- . . . , Aug. 11, 2015, 6 pages.
Advisory Action dated Jun. 28, 2018, issued in connection with U.S. Appl. No. 15/438,744, filed Feb. 21, 2017, 3 pages.
Advisory Action dated Dec. 31, 2018, issued in connection with U.S. Appl. No. 15/804,776, filed Nov. 6, 2017, 4 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Examination Report dated Oct. 30, 2018, issued in connection with Australian Application No. 2017222436, 3 pages.
"Automatic Parameter Tying in Neural Networks" ICLR 2018, 14 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Office Action dated Nov. 14, 2018, issued in connection with Canadian Application No. 3015491, 3 pages.
Chinese Patent Office, First Office Action and Translation dated Mar. 20, 2019, issued in connection with Chinese Application No. 201780025028.2, 18 pages.
Chinese Patent Office, First Office Action and Translation dated Mar. 27, 2019, issued in connection with Chinese Application No. 201780025029.7, 9 pages.
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Jan. 3, 2019, issued in connection with European Application No. 177570702, 8 pages.
European Patent Office, European Extended Search Report dated Jan. 3, 2019, issued in connection with European Application No. 17757075.1, 9 pages.
European Patent Office, European Extended Search Report dated Oct. 30, 2017, issued in connection with EP Application No. 17174435.2, 11 pages.
European Patent Office, European Office Action dated Jan. 22, 2019, issued in connection with European Application No. 17174435.2, 9 pages.
Chinese Patent Office, Second Office Action and Translation dated Jul. 18, 2019, issued in connection with Chinese Application No. 201780025029.7, 14 pages.
First Action Interview Office Action dated Jul. 5, 2019, issued in connection with U.S. Appl. No. 16/227,308, filed Dec. 20, 2018, 4 pages.
Non-Final Office Action dated Jul. 24, 2019, issued in connection with U.S. Appl. No. 16/439,009, filed Jun. 12, 2019, 26 pages.
Non-Final Office Action dated Jun. 27, 2019, issued in connection with U.S. Appl. No. 16/437,476, filed Jun. 11, 2019, 8 pages.
Non-Final Office Action dated Jul. 3, 2019, issued in connection with U.S. Appl. No. 15/948,541, filed Apr. 9, 2018, 7 pages.
Notice of Allowance dated Jul. 17, 2019, issued in connection with U.S. Appl. No. 15/718,911, filed Sep. 28, 2017, 5 pages.
Notice of Allowance dated Jul. 18, 2019, issued in connection with U.S. Appl. No. 15/438,749, filed Feb. 21, 2017, 9 pages.
Notice of Allowance dated Jul. 18, 2019, issued in connection with U.S. Appl. No. 15/721,141, filed Sep. 29, 2017, 8 pages.
International Searching Authority, International Search Report and Written Opinion dated May 30, 2017, issued in connection with International Application No. PCT/US2017/018728, Filed on Feb. 21, 2017, 11 pages.
Jo et al., "Synchronized One-to-many Media Streaming with Adaptive Playout Control," Proceedings of SPIE, 2002, pp. 71-82, vol. 4861.

(56) References Cited

OTHER PUBLICATIONS

Jones, Stephen, "Dell Digital Audio Receiver: Digital upgrade for your analog stereo," Analog Stereo, Jun. 24, 2000 retrieved Jun. 18, 2014, 2 pages.
Jose Alvarez and Mathieu Salzmann "Compression-aware Training of Deep Networks" 31st Conference on Neural Information Processing Systems, Nov. 13, 2017, 12pages.
Korean Patent Office, Korean Office Action dated May 8, 2019, issued in connection with Korean Application No. 10-2018-7027451, 7 pages.
Korean Patent Office, Korean Office Action dated May 8, 2019, issued in connection with Korean Applicatio No. 10-2018-7027452, 5 pages.
Louderback, Jim, "Affordable Audio Receiver Furnishes Homes With MP3," TechTV Vault. Jun. 28, 2000 retrieved Jul. 10, 2014, 2 pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, 2012, 4pages.
Morales-Cordovilla et al. "Room Localization for Distant Speech Recognition," Proceedings of Interspeech 2014, Sep. 14, 2014, 4 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 2 page.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098760, filed Apr. 14, 2016, 13 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438,725, filed Feb. 21, 2017, 15 pages.
Non-Final Office Action dated Sep. 10, 2018, issued in connection with U.S. Appl. No. 15/670,361, filed Aug. 7, 2017, 17 pages.
Non-Final Office Action dated Dec. 12, 2016, issued in connection with U.S. Appl. No. 15/098,718, filed Apr. 14, 2016, 11 pages.
Non-Final Office Action dated Feb. 12, 2019, issued in connection with U.S. Appl. No. 15/670,361, filed Aug. 7, 2017, 13 pages.
Non-Final Office Action dated Nov. 13, 2018, issued in connection with U.S. Appl. No. 15/717,621, filed Sep. 27, 2017, 23 pages.
Non-Final Office Action dated Nov. 13, 2018, issued in connection with U.S. Appl. No. 16/160,107, filed Oct. 15, 2018, 8 pages.
Non-Final Office Action dated Sep. 14, 2017, issued in connection with U.S. Appl. No. 15/178,180, filed Jun. 9, 2016, 16 pages.
Non-Final Office Action dated Sep. 14, 2018, issued in connection with U.S. Appl. No. 15/959,907, filed Apr. 23, 2018, 15 pages.
Non-Final Office Action dated Jan. 15, 2019, issued in connection with U.S. Appl. No. 16/173,797, filed Oct. 29, 2018, 6 pages.
Non-Final Office Action dated Mar. 16, 2018, issued in connection with U.S. Appl. No. 15/681,937, filed Aug. 21, 2017, 5 pages.
Non-Final Office Action dated Oct. 16, 2018, issued in connection with U.S. Appl. No. 15/131,254, filed Apr. 18, 2016, 16 pages.
Non-Final Office Action dated Apr. 18, 2018, issued in connection with U.S. Appl. No. 15/811,468, filed Nov. 13, 2017, 14 pages.
Non-Final Office Action dated Jan. 18, 2019, issued in connection with U.S. Appl. No. 15/721,141, filed Sep. 29, 2017, 18 pages.
Non-Final Office Action dated Apr. 19, 2017, issued in connection with U.S. Appl. No. 15/131,776, filed Apr. 18, 2016, 12 pages.
Non-Final Office Action dated Feb. 20, 2018, issued in connection with U.S. Appl. No. 15/211,748, filed Jul. 15, 2016, 31 pages.
Non-Final Office Action dated Feb. 21, 2019, issued in connection with U.S. Appl. No. 16/214,666, filed Dec. 10, 2018, 12 pages.
Non-Final Office Action dated May 22, 2018, issued in connection with U.S. Appl. No. 15/946,599, filed Apr. 5, 2018, 19 pages.
Non-Final Office Action dated May 23, 2019, issued in connection with U.S. Appl. No. 16/154,071, filed Oct. 8, 2018, 36 pages.
Non-Final Office Action dated Aug. 24, 2017, issued in connection with U.S. Appl. No. 15/297,627, filed Oct. 19, 2016, 13 pages.
Non-Final Office Action dated Jul. 25, 2017, issued in connection with U.S. Appl. No. 15/273,679, filed Jul. 22, 2016, 11 pages.
Non-Final Office Action dated Dec. 26, 2018, issued in connection with U.S. Appl. No. 16/154,469, filed Oct. 8, 2018, 7 pages.
Non-Final Office Action dated Jan. 26, 2017, issued in connection with U.S. Appl. No. 15/098,867, filed Apr. 14, 2016, 16 pages.
Non-Final Office Action dated Oct. 26, 2017, issued in connection with U.S. Appl. No. 15/438,744, filed Feb. 21, 2017, 12 pages.
Non-Final Office Action dated Jun. 27, 2018, issued in connection with U.S. Appl. No. 15/438,749, filed Feb. 21, 2017, 16 pages.
Non-Final Office Action dated Mar. 29, 2019, issued in connection with U.S. Appl. No. 16/102,650, filed Aug. 13, 2018, 11 pages.
Non-Final Office Action dated May 3, 2019, issued in connection with U.S. Appl. No. 16/178,122, filed Nov. 1, 2018, 14 pages.
Non-Final Office Action dated Oct. 3, 2018, issued in connection with U.S. Appl. No. 16/102,153, filed Aug. 13, 2018, 20 pages.
Non-Final Office Action dated Apr. 30, 2019, issued in connection with U.S. Appl. No. 15/718,521, filed Sep. 28, 2017, 39 pages.
Non-Final Office Action dated Jun. 30, 2017, issued in connection with U.S. Appl. No. 15/277,810, filed Sep. 27, 2016, 13 pages.
Non-Final Office Action dated Apr. 4, 2019, issued in connection with U.S. Appl. No. 15/718,911, filed Sep. 28, 2017, 21 pages.
Non-Final Office Action dated Jan. 4, 2019, issued in connection with U.S. Appl. No. 15/948,541, filed Apr. 9, 2018, 6 pages.
Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Sep. 6, 2017, issued in connection with U.S. Appl. No. 15/131,254, filed Apr. 18, 2016, 13 pages.
Non-Final Office Action dated Sep. 6, 2018, issued in connection with U.S. Appl. No. 15/098,760, filed Apr. 14, 2016, 29 pages.
Non-Final Office Action dated Apr. 9, 2018, issued in connection with U.S. Appl. No. 15/804,776, filed Nov. 6, 2017, 18 pages.
Non-Final Office Action dated May 9, 2018, issued in connection with U.S. Appl. No. 15/818,051, filed Nov. 20, 2017, 22 pages.
Notice of Allowance dated Dec. 4, 2017, issued in connection with U.S. Appl. No. 15/277,810, filed Sep. 27, 2016, 5 pages.
Notice of Allowance dated Jul. 5, 2018, issued in connection with U.S. Appl. No. 15/237,133, filed Aug. 15, 2016, 5 pages.
Notice of Allowance dated Jul. 9, 2018, issued in connection with U.S. Appl. No. 15/438,741, filed Feb. 21, 2017, 5 pages.
Notice of Allowance dated Apr. 1, 2019, issued in connection with U.S. Appl. No. 15/935,966, filed Mar. 26, 2018, 5 pages.
Notice of Allowance dated Aug. 1, 2018, issued in connection with U.S. Appl. No. 15/297,627, filed Oct. 19, 2016, 9 pages.
Notice of Allowance dated Apr. 11, 2018, issued in connection with U.S. Appl. No. 15/719,454, filed Sep. 28, 2017, 15 pages.
Notice of Allowance dated Dec. 12, 2018, issued in connection with U.S. Appl. No. 15/811,468, filed Nov. 13, 2017, 9 pages.
Notice of Allowance dated Jul. 12, 2017, issued in connection with U.S. Appl. No. 15/098,805, filed Apr. 14, 2016, 8 pages.
Notice of Allowance dated Jun. 12, 2019, issued in connection with U.S. Appl. No. 15/670,361, filed Aug. 7, 2017, 7 pages.
Notice of Allowance dated Sep. 12, 2018, issued in connection with U.S. Appl. No. 15/438,744, filed Feb. 21, 2017, 15 pages.

(56) References Cited

OTHER PUBLICATIONS

Notice of Allowance dated Dec. 13, 2017, issued in connection with U.S. Appl. No. 15/784,952, filed Oct. 16, 2017, 9 pages.
Notice of Allowance dated Feb. 13, 2019, issued in connection with U.S. Appl. No. 15/959,907, filed Apr. 23, 2018, 10 pages.
Notice of Allowance dated Aug. 14, 2017, issued in connection with U.S. Appl. No. 15/098,867, filed Apr. 14, 2016, 10 pages.
Notice of Allowance dated Feb. 14, 2017, issued in connection with U.S. Appl. No. 15/229,855, filed Aug. 5, 2016, 11 pages.
Notice of Allowance dated Jun. 14, 2017, issued in connection with U.S. Appl. No. 15/282,554, filed Sep. 30, 2016, 11 pages.
Notice of Allowance dated Nov. 14, 2018, issued in connection with U.S. Appl. No. 15/297,627, filed Oct. 19, 2016, 5 pages.
Notice of Allowance dated Dec. 15, 2017, issued in connection with U.S. Appl. No. 15/223,218, filed Jul. 29, 2016, 7 pages.
Notice of Allowance dated Mar. 15, 2019, issued in connection with U.S. Appl. No. 15/804,776, filed Nov. 6, 2017, 9 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Sep. 17, 2018, issued in connection with U.S. Appl. No. 15/211,689, filed Jul. 15, 2016, 6 pages.
Notice of Allowance dated Apr. 18, 2019, issued in connection with U.S. Appl. No. 16/173,797, filed Oct. 29, 2018, 9 pages.
Notice of Allowance dated Dec. 19, 2018, issued in connection with U.S. Appl. No. 15/818,051, filed Nov. 20, 2017, 9 pages.
Notice of Allowance dated Jul. 19, 2018, issued in connection with U.S. Appl. No. 15/681,937, filed Aug. 21, 2017, 7 pages.
Notice of Allowance dated Mar. 20, 2018, issued in connection with U.S. Appl. No. 15/784,952, filed Oct. 16, 2017, 7 pages.
Notice of Allowance dated Sep. 20, 2018, issued in connection with U.S. Appl. No. 15/946,599, filed Apr. 5, 2018, 7 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Apr. 24, 2019, issued in connection with U.S. Appl. No. 16/154,469, filed Oct. 8, 2018, 5 pages.
Notice of Allowance dated Mar. 27, 2019, issued in connection with U.S. Appl. No. 16/214,666, filed Dec. 10, 2018, 6 pages.
Notice of Allowance dated Mar. 28, 2018, issued in connection with U.S. Appl. No. 15/699,982, filed Sep. 8, 2017, 17 pages.
Notice of Allowance dated Dec. 29, 2017, issued in connection with U.S. Appl. No. 15/131,776, filed Apr. 18, 2016, 13 pages.
Notice of Allowance dated Apr. 3, 2019, issued in connection with U.S. Appl. No. 16/160,107, filed Oct. 15, 2018, 7 pages.
Notice of Allowance dated Jul. 30, 2018, issued in connection with U.S. Appl. No. 15/098,718, filed Apr. 14, 2016, 5 pages.
Notice of Allowance dated Nov. 30, 2018, issued in connection with U.S. Appl. No. 15/438,725, filed Feb. 21, 2017, 5 pages.
Notice of Allowance dated May 31, 2019, issued in connection with U.S. Appl. No. 15/717,621, filed Sep. 27, 2017, 9 pages.
Notice of Allowance dated Oct. 5, 2018, issued in connection with U.S. Appl. No. 15/211,748, filed Jul. 15, 2018, 10 pages.
Notice of Allowance dated Feb. 6, 2019, issued in connection with U.S. Appl. No. 16/102,153, filed Aug. 13, 2018, 9 pages.
Notice of Allowance dated Jun. 7, 2019, issued in connection with U.S. Appl. No. 16/102,153, filed Aug. 13, 2018, 9 pages.
Notice of Allowance dated Aug. 9, 2018, issued in connection with U.S. Appl. No. 15/229,868, filed Aug. 5, 2016, 11 pages.
Notice of Allowance dated Mar. 9, 2018, issued in connection with U.S. Appl. No. 15/584,782, filed May 2, 2017, 8 pages.
Palm, Inc., "Handbook for the Palm VII Handheld," May 2000, 311 pages.
Presentations at WinHEC 2000, May 2000, 138 pages.

* cited by examiner

PLAYBACK DEVICE SUPPORTING CONCURRENT VOICE ASSISTANT SERVICES

CROSS REFERENCE TO RELATED APPLICATIONS

This application claims priority under 35 U.S.C. § 120 to, and is a continuation of, U.S. non-provisional patent application Ser. No. 16/173,797, filed on Oct. 29, 2018, and entitled "Voice Control of Playback Device Using Voice Assistance Service(s)," which is incorporated herein by reference in its entirety.

This application claims priority under 35 U.S.C. § 120 to, and is a continuation of, U.S. non-provisional patent application Ser. No. 15/229,868, filed on Aug. 5, 2016 entitled "Multiple Voice Services," issued as U.S. Pat. No. 10,115,400 on Oct. 30, 2018, which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
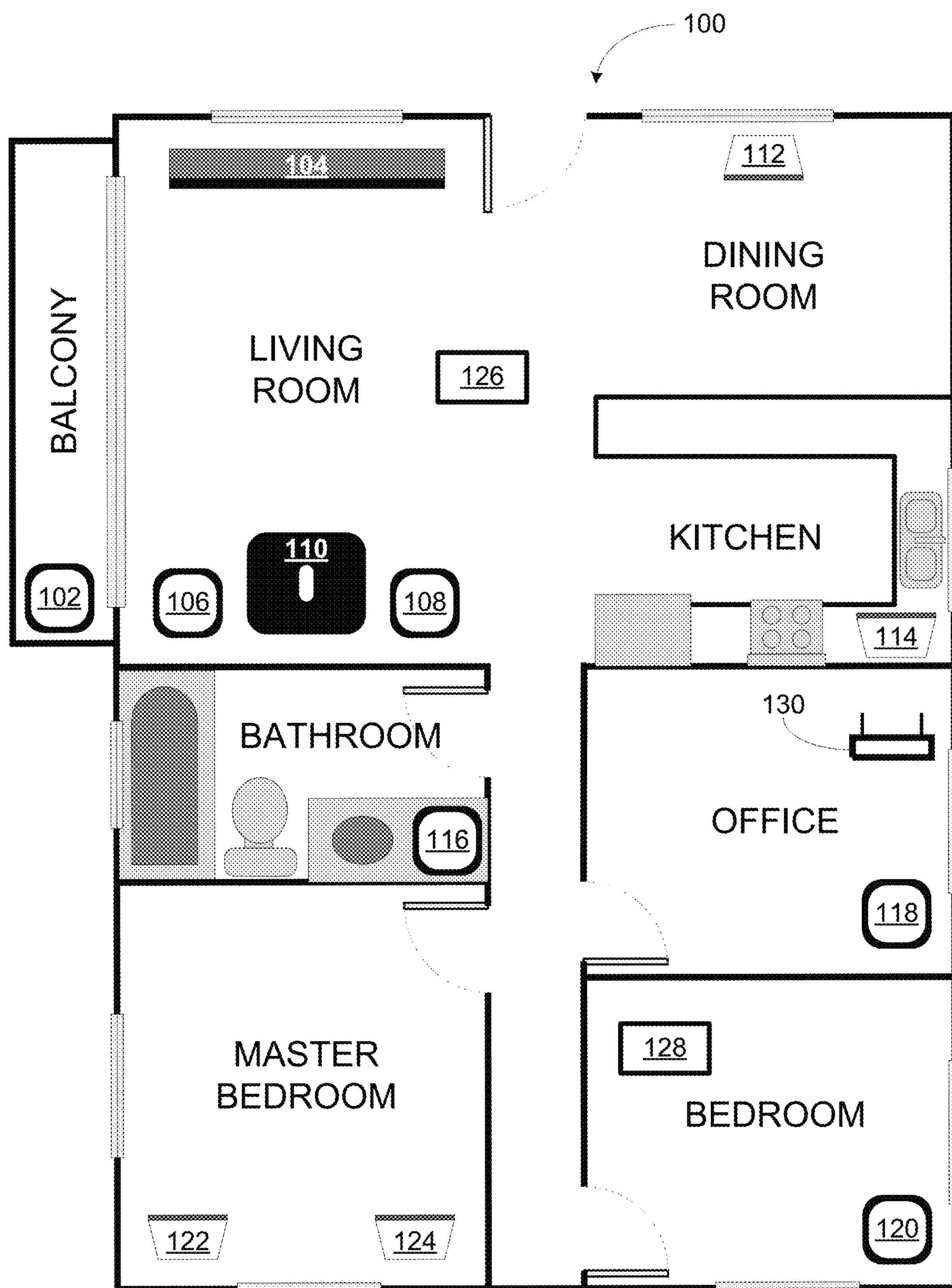
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Networked microphone devices (NMDs) may be used to control a household using voice control. A NMD may be, for example, a SONOS® playback device, server, or system capable of receiving voice input via a microphone. Additionally, a NMD may be a device other than a SONOS® playback device, server, or system (e.g., AMAZON® ECHO®, APPLE® IPHONE®) capable of receiving voice inputs via a microphone. U.S. application Ser. No. 15/098,867 entitled, "Default Playback Device Designation," which is hereby incorporated by reference, provides examples of voice-enabled household architectures. Voice control can be beneficial for various devices with a "smart" home, such as playback devices, wireless illumination devices, thermostats, door locks, home automation, as well as other examples.

In some implementations, voice inputs detected by a NMD are sent to a voice service for processing. A NMD, such as a playback device, may operate as a microphone/speaker interface to the voice service. Voice inputs are detected by a microphone of the NMD and then transmitted to a particular voice service for processing. The voice service may then return a command or other result of the voice input.

A particular voice service may be selected for a media playback system, perhaps during a setup procedure. A user might select the same voice service that they use on their smartphone or tablet computer (or other personal electronic device), perhaps because they are familiar with that voice service or they wish to have a similar experience using voice control on their playback device as on their smartphone. Where a particular voice service is configured on a user's smartphone, the smartphone may transmit configuration information (e.g., user credentials) for the voice service to the NMD to facilitate automatic configuration of that voice service on the NMD.

In some cases, multiple voice services may be configured for a NMD, or a system of NMDS (e.g., a media playback system of playback devices). One or more services might be configured during a set-up procedure. Additional voice services may be configured for the system later on. As such, a NMD as described herein may act as an interface with multiple voice services, perhaps alleviating a need to have a NMD from each of the voice services to interact with the respective voice services. Yet further, the NMD may operate in concert with service-specific NMDs present in a household to process a given voice command.

Where two or more voice services are configured for a NMD, a particular voice service can be invoked by utterance of a wake-work corresponding to the particular voice service. For instance, in querying AMAZON®, a user might speak the wake-word "Alexa" followed by a voice input. Other examples include "Ok, Google" for querying GOOGLE® and "Hey, Siri" for querying APPLE®.

Alternatively, if no wake-word is used with a given voice input, then the NMD may identify a voice service to process that voice input. In some cases, the NMD might identify a default voice service. Alternatively, the NMD may identify a particular voice service based on context. For instance, the NMD may use a recently-queried voice service based on the assumption that the user would like to use the same voice service again. Other examples are also possible.

As noted above, in some cases, a generic wake-word may be used to indicate a voice input to a NMD. In some cases, this may be a manufacturer-specific wake-word rather than a wake-word tied to any particular voice service (e.g., "Hey, Sonos" where the NMD is a SONOS® playback device). Given such a wake-word, the NMD may identify a particular voice service to process the request. For instance, if the voice input following the wake-word is related to a particular type of command (e.g., music playback), then the voice input may be sent to a particular voice service associated with that type of command (e.g. a streaming music service having voice command capabilities).

In some cases, the NMD may transmit the voice input to multiple voice services, which may result in respective results from the queried voice services. The NMD may evaluate the results and respond with the "best" result (e.g., the result best matching the intended action). For instance, if the voice input was "Hey, Sonos, play Taylor Swift," a first voice service might respond with "Taylor Swift" search results while a second voice service responds with identifiers of audio tracks by artist Taylor Swift. In that case, the NMD may use the identifiers of Taylor Swift audio tracks from the second voice service to play back Taylor Swift music in accordance with the voice input.

As noted above, example techniques relate to voice services. An example implementation may include a NMD receiving, via a microphone, voice data indicating a voice input. The NMD may identify, from among multiple voice services registered to a media playback system, a voice service to process the voice input and cause the identified voice service to process the voice input.

Another example implementation may include a NMD receiving input data indicating a command to register one or more voice services with a media playback system. The NMD may detect voice services that are registered on the NMD. The NMD may cause the voice services that are registered on the NMD to be registered on the media playback system.

A third example implementation may include a NMD receiving, via a microphone, voice data indicating a voice input. The NMD may determine that a portion of the received voice data represents a generic wake-word not corresponding to a specific voice service. The NMD may cause multiple voice services to process the voice input. The NMD may output results from a given one of the multiple voice services.

Each of the these example implementations may be embodied as a method, a device configured to carry out the implementation, a system of devices configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein. Further, any example operation described as being performed by a given device to illustrate a technique may be performed by any suitable devices, including the devices described herein. Yet further, any device may cause another device to perform any of the operations described herein.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102, 104, 106, 108, 110, 112, 114, 116, 118, 120, 122, and 124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
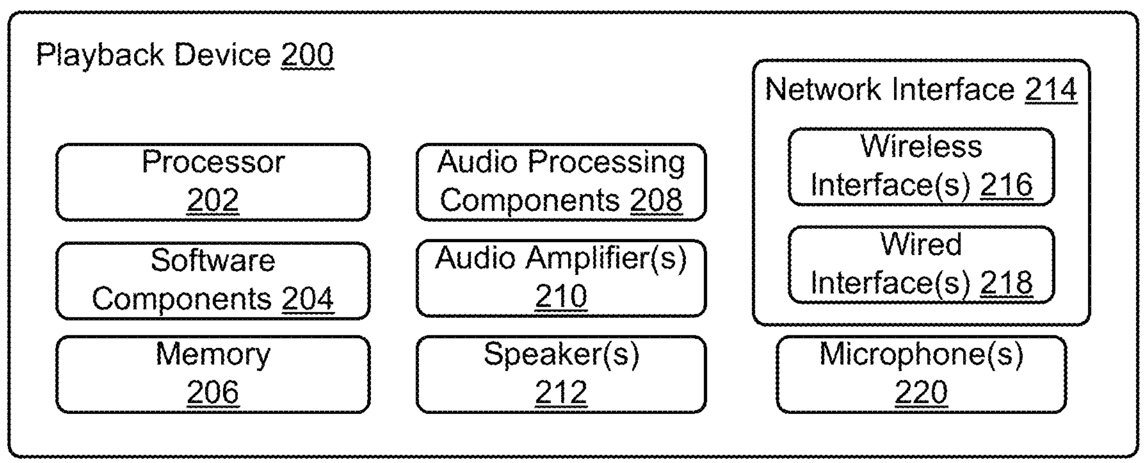
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not include the microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
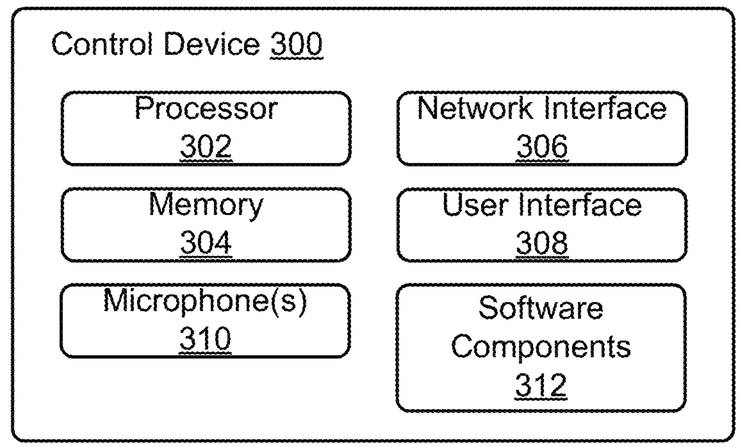
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
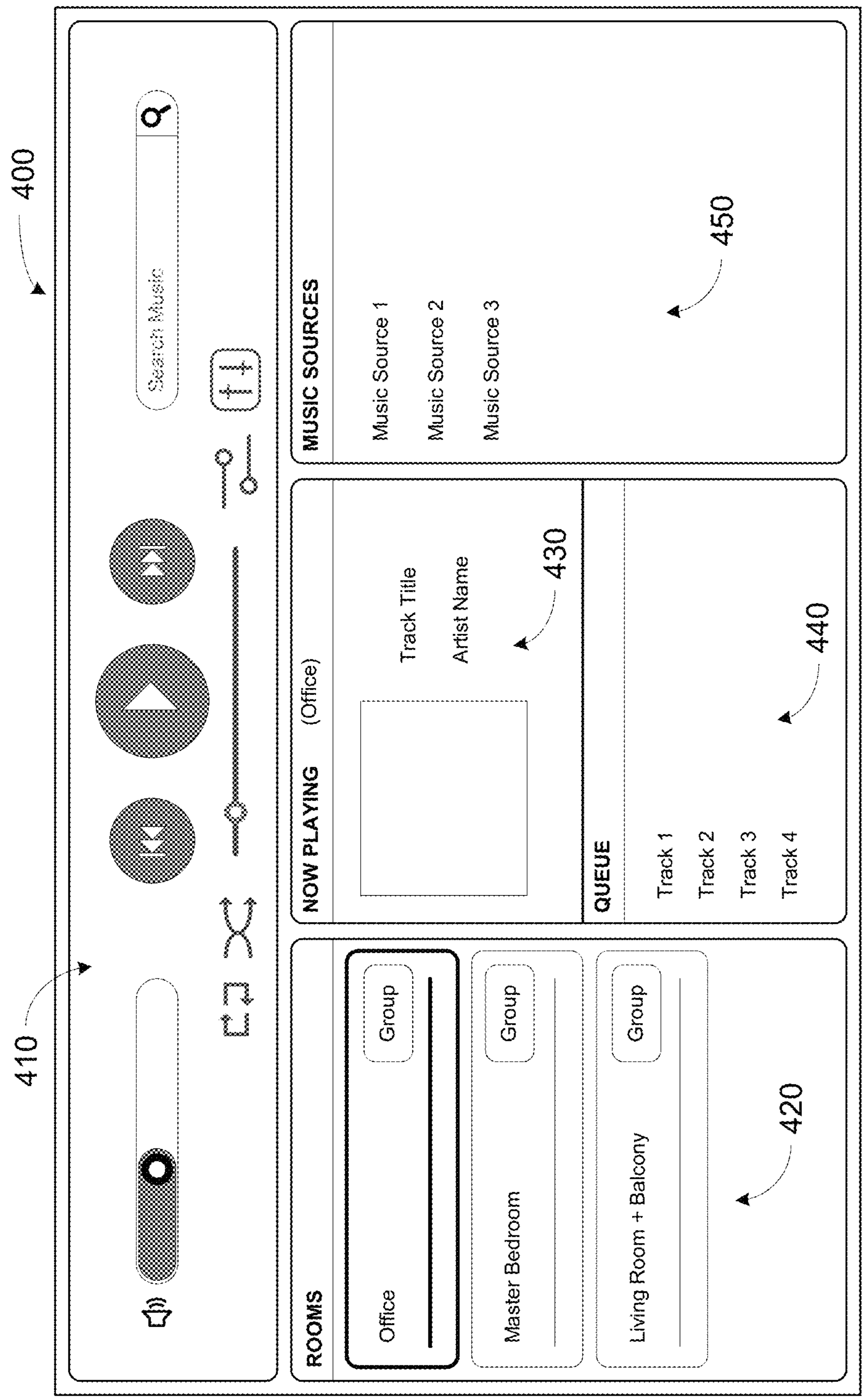
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
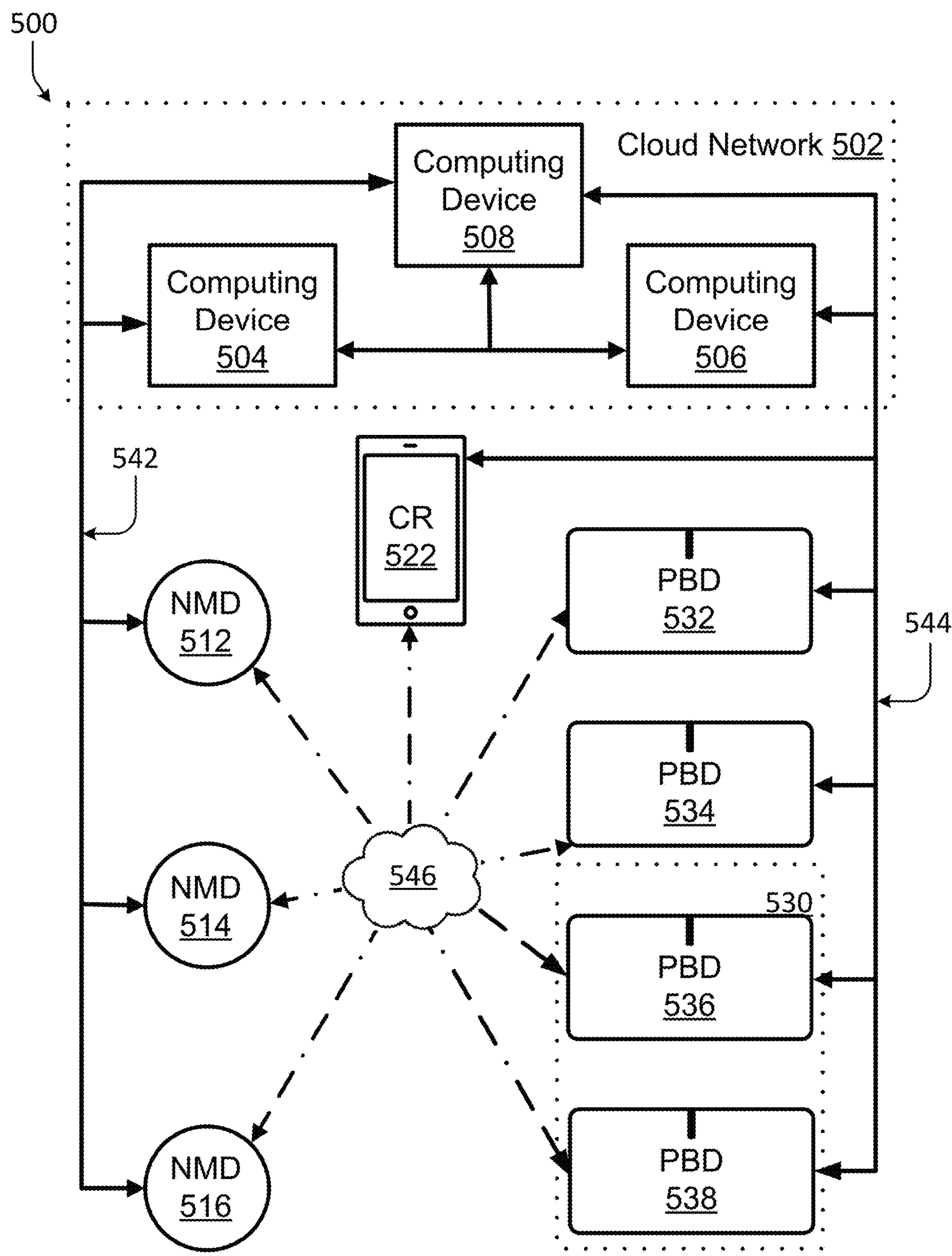
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300.

In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, a single access point may include communication paths 542 and 544. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
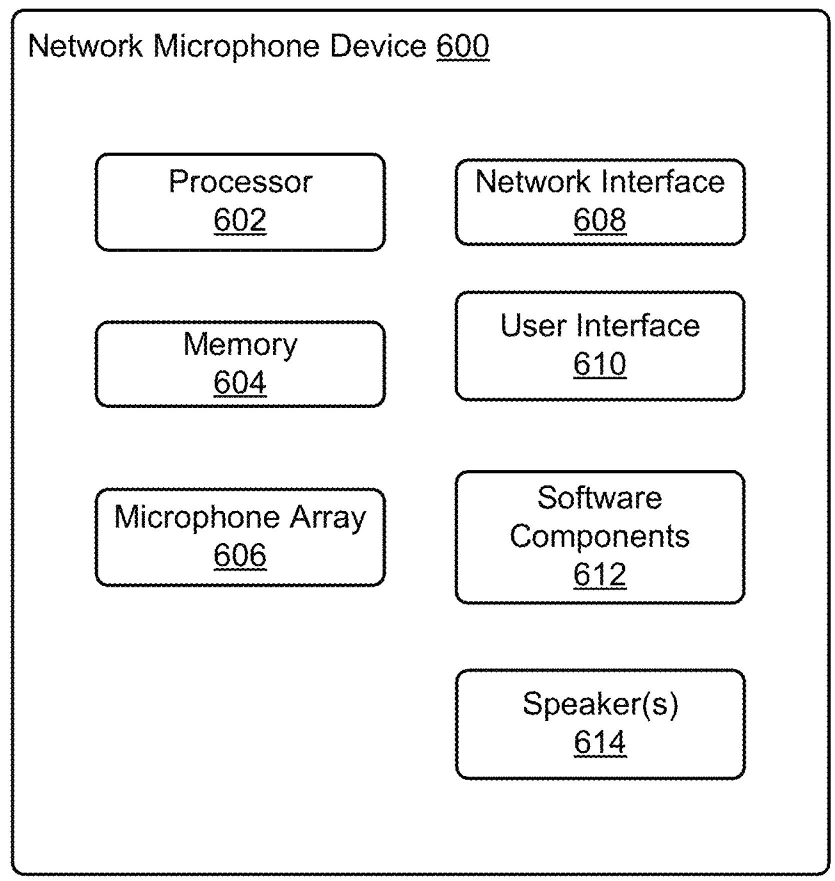
FIG. 6 shows a functional block diagram of an example network microphone device.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

Figure 7:
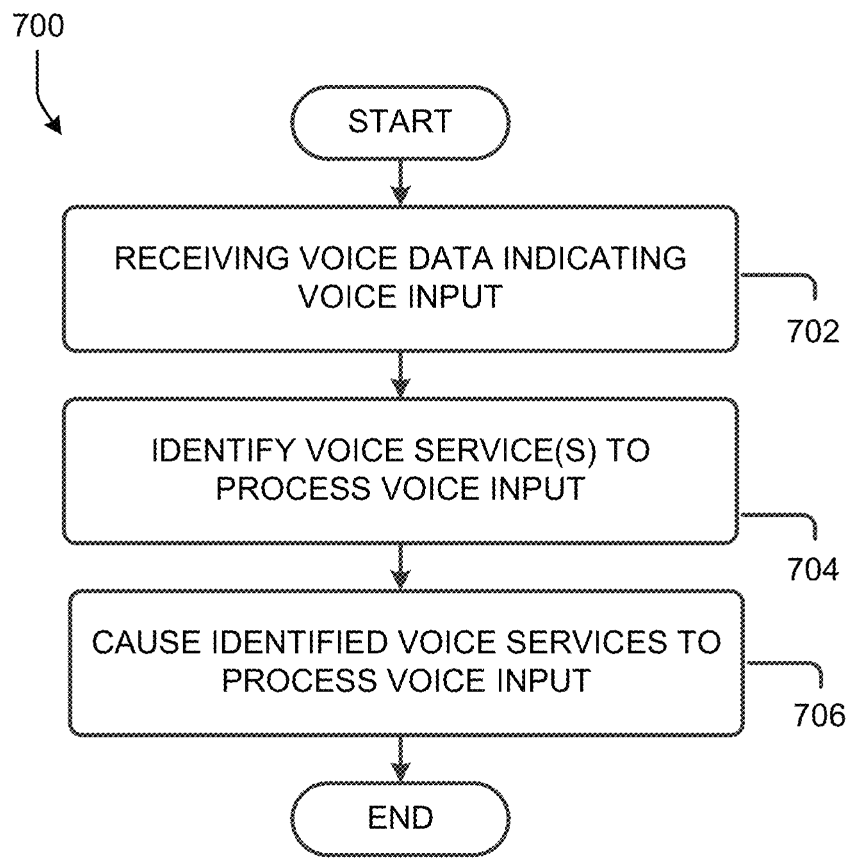
FIG. 7 shows a technique to cause a voice service to process a voice input according to example embodiments.
Figure 8:
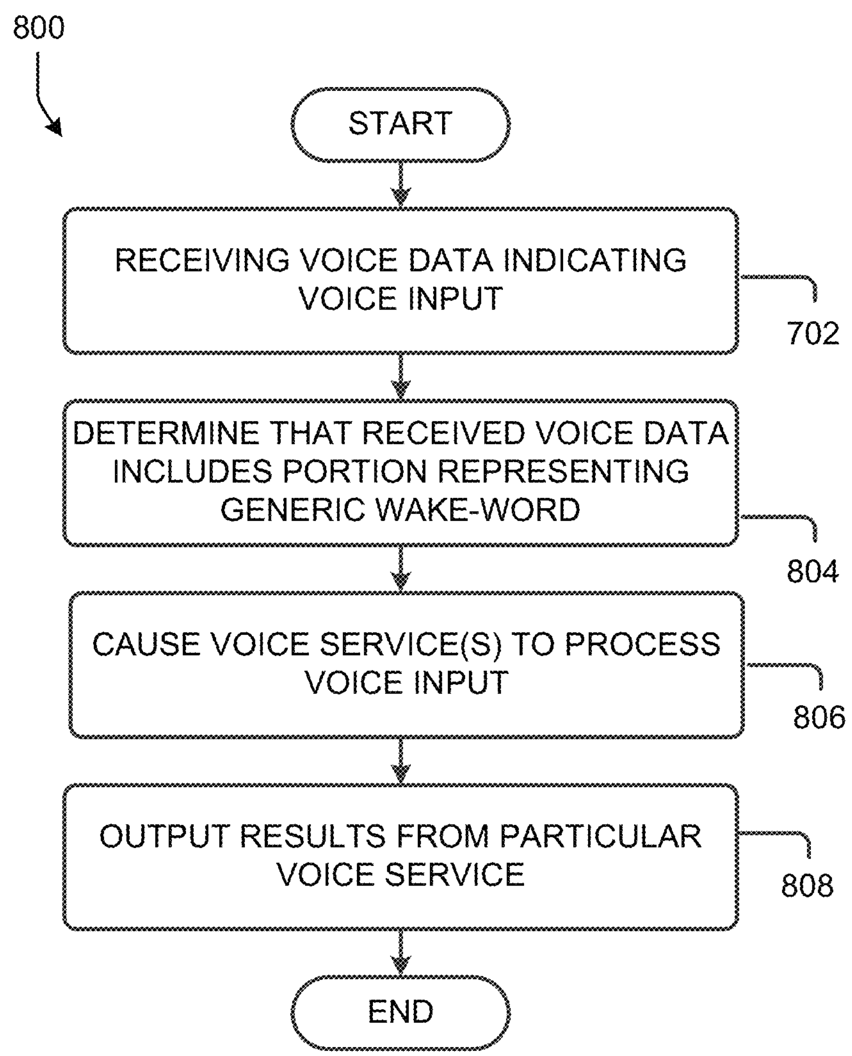
FIG. 8 shows another technique to cause a voice service to process a voice input according to example embodiments.
Figure 9:
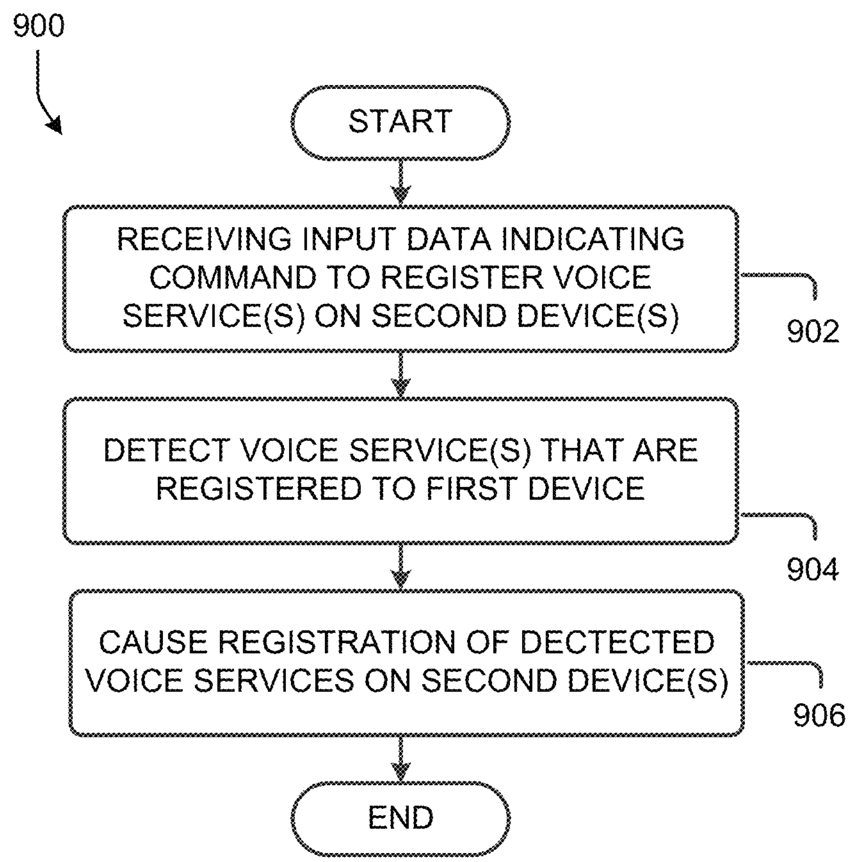
FIG. 9 shows a technique to register a voice service according to example embodiments.

Moving now to several example implementations, implementations 700, 800, and 900 shown in FIGS. 7, 8, and 9, respectively present example embodiments of techniques described herein. These example embodiments that can be implemented within an operating environment including, for example, the media playback system 100 of FIG. 1, one or more of the playback device 200 of FIG. 2, or one or more of the control device 300 of FIG. 3, as well as other devices described herein and/or other suitable devices. Further, operations illustrated by way of example as being performed by a media playback system can be performed by any suitable device, such as a playback device or a control device of a media playback system. Implementations 700, 800, and 900 may include one or more operations, functions, or actions as illustrated by one or more of blocks shown in FIGS. 7, 8, and 9. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

III. Example Systems and Methods to Invoke Voice Service

As discussed above, in some examples, a computing device may use a voice service to process a voice command.

Implementation 700 is an example technique to cause a voice service to process a voice input.

a. Receive Voice Data Indicating a Voice Input

At block 702, implementation 700 involves receiving voice data indicating a voice input. For instance, a NMD, such as NMD 600, may receive, via a microphone, voice data indicating a voice input. As further examples, any of playback devices 102, 104, 106, 108, 110, 112, 114, 116, 118, 120, 122, and 124 or control devices 126 and 128 of FIG. 1 may be a NMD and may receive voice data indicating a voice input. Yet further examples NMDs include NMDs 512, 514, and 516, PBDs 532, 534, 536, and 538, and CR 522 of FIG. 5.

A NMD may continuously record ambient noise (i.e., listen for voice inputs) via one or more microphones. The NMD may store the continuous recording in a ring or circular buffer. In such a buffer, the recording may be overwritten (i.e., discarded) unless the recording includes a voice input. The buffer may be stored locally and/or remotely via any of the devices or servers described herein. In such cases, receiving voice data indicating the voice input may involve recording into the buffer voice data that includes the voice input.

A NMD may detect that a voice input has been received by detecting that a portion of the voice data includes a wake-up word or phrase. For instance, a voice input might include a wake-word followed by a voice command. The wake-word may trigger a time period or window for the NMD to actively listen for a voice input. The time period or window may expire after a certain duration of time (e.g., one minute after the NMD receives an initial voice input). U.S. application Ser. No. 15/131,776 entitled, "Action based on User ID," which is hereby incorporated by reference describes further examples. Several example wake-words in commercial use include "Hey, Siri" (APPLE®), "Ok, Google" (GOOGLE®), and "Alexa" (AMAZON®). Alternatively, a wake-word may be custom (e.g., user-defined).

To illustrate, referring back to FIG. 1, a user may speak a particular voice input while in the Master Bedroom zone. Playback device 122 (and/or playback device 124), operating as NMDs, may be listening (i.e., recording via a microphone, perhaps to a buffer) for voice inputs and detect the user's voice as a voice input. The particular voice input may include a wake-word to facilitate the NMD recognizing the user's voice as a voice input.

Example voice commands may include commands to modify any of the media playback system controls or playback settings. Playback settings may include, for example, playback volume, playback transport controls, music source selection, and grouping, among other possibilities. Other voice commands may include operations to adjust television control or play settings, mobile phone device settings, or illumination devices, among other device operations. As more household devices become "smart" (e.g., by incorporating a network interface), voice commands may be used to control various household devices.

In some cases, the NMD may receive voice data indicating the voice input via a network interface, perhaps from another NMD within a household. The NMD may receive this recording in addition to receiving voice data indicating the voice input via a microphone (e.g., if the two NMDs are both within detection range of the voice input).

In such embodiments, the NMD might not continuously record ambient noise. Rather, in some instances, the NMD may receive a voice input or indication that instructs the NMD to "wake up" and start recording voice inputs or commands. For example, a first NMD (e.g., playback device 104 shown in FIG. 1) may receive a voice input and, in certain situations described herein, send an indication to one or more second NMDs to start recording (e.g., playback device 106 and/or 108, among other possible examples).

Within examples, the voice recordings from multiple NMDs may be refined, processed, and/or combined into a single voice input before the NMD device receives the voice data. By way of example, NMD 512 may receive voice recordings from one or more other NMDs, such as 514 or 516. In some embodiments, PBDs 532, 534, 536 and/or 538 may be configured as NMDs, and the NMD 512 may receive voice recordings from one of PBDs 532, 534, 536 and/or 538. A NMD (or multiple NMDs) may refine, process, and/or combine the voice recordings into a single voice input and send the single voice input to the computing device for further processing.

b. Identify Voice Service(s) to Process the Voice Input

At block 704, implementation 700 involves identifying one or more voice services to process the voice input. For instance, a NMD may identify a particular voice service to process the voice input indicated in the received voice data. Alternatively, the NMD may identify multiple voice services to process the voice input.

The NMD may identify the particular voice service to process the voice input from among available voice services. Voice services may be made available to an NMD using various techniques. Available voice services may include voice services registered with the NMD. Registration of a given voice service with the NMD may involve providing user credentials (e.g., user name and password) of the voice service to the NMD and/or providing an identifier of the NMD to the voice service. Such registration may configure the NMD to receive voice inputs on behalf of the voice service and perhaps configure the voice service to accept voice inputs from the NMD for processing. Registration may occur within a set-up procedure.

In some cases, the NMD may be associated with a media playback system. The NMD may operate as part of the media playback system itself (e.g., as a controller device or playback device) or as another device that is interconnected with the media playback system, perhaps to facilitate certain operations of the media playback system (e.g., voice control of the playback devices). One or more voice services may be registered with a given media playback system and the NMD may identify a registered voice service to process the voice input.

Registration of the media playback system may configure NMDs of the media playback system (e.g., controller devices, playback devices, or otherwise associated devices) to receive voice inputs on behalf of the voice service. Further, registration may configure the voice service to accept voice inputs from these devices for processing. Registration of a voice service with a media playback system may occur within a set-up procedure. Example set-up procedures include procedures to set-up a playback device (or multiple playback devices) and/or a controller device into a new media playback system. Other example set-up procedures include procedures to modify the media playback system (e.g., to add or remove a device from the system, or to configure a voice service with the system).

In some cases, a single voice service may be available to the NMD, which may simply identification of the voice service to process the voice input. Voice inputs received by a NMD may be transmitted directly to the voice service and responses may be provided by the NMD. In such an embodiment, the NMD operates as a microphone and speaker interface for the single voice service.

In other cases, multiple voice services may be available to the NMD for processing of the voice input. In such cases, the NMD may identify a particular voice service of the multiple voice services to process the voice input. For instance, the NMD may identify a particular voice service from among multiple voice services registered to a media playback system. As indicated above, the NMD may be part of the media playback system (e.g., as a playback device or controller device) or otherwise associated with the system.

Identification of a particular voice service to process the voice input may be based on a wake-word or phrase in the voice input. For instance, after receiving voice data indicating a voice input, the NMD may determine that a portion of the voice data represents a particular wake-word. Further, the NMD may determine that the particular wake-word corresponds to a specific voice service. In other words, the NMD may determine that the particular wake-word or phrase is used to invoke a specific voice service. For instance, the particular wake-word may be "Hey, Siri" to invoke APPLE®'s voice service, "Ok, Google" to invoke GOOGLE®'s voice service, "Alexa" to invoke AMAZON®'s voice service, or "Hey, Cortana" to invoke Microsoft's voice service. Alternatively, a custom wake-word (e.g., user-defined) may be defined to invoke a particular voice service. Where the NMD determines that particular wake-word in the received voice data corresponds to a specific voice service, the NMD may identify that specific voice service as the voice service to process the voice input in the voice data.

Determining that the particular wake-word corresponds to a specific voice service may involve querying one or more voice services with the voice data (e.g., the portion of the voice data corresponding to the wake-word or phrase). For instance, a voice service may provide an application programming interface that the NMD can invoke to determine that whether the voice data includes the wake-word or phrase corresponding to that voice service. The NMD may invoke the API by transmitting a particular query of the voice service to the voice service along with data representing the wake-word portion of the received voice data. Alternatively, the NMD may invoke the API on the NMD itself. Registration of a voice service with the NMD or with the media playback system may integrate the API or other architecture of the voice service with the NMD.

Where multiple voice services are available to the NMD, the NMD might query wake-word detection algorithms corresponding to each voice service of the multiple voice services. As noted above, querying such detection algorithms may involve invoking respective APIs of the multiple voice services, either locally on the NMD or remotely using a network interface. In response to a query to a wake-word detection algorithm of a given voice service, the NMD may receive a response indicating whether or not the voice data in the query included the wake-word corresponding to that voice service. Where a wake-word detection algorithm of a specific voice service detected that the received voice data represents the particular wake-word corresponding to the specific voice service, the NMD may select that specific voice service as the voice service to process the voice input.

In some cases, the received voice data might not include a recognizable wake-word corresponding to a specific voice service, but nonetheless include a voice input. Such a situation may arise, where due to ambient noise or other factors, a given wake-word might not be clearly detected, such that the wake-word detection algorithm(s) do not recognize the given wake-word as corresponding to any specific voice service. Alternatively, a user might not speak a wake-word corresponding to a specific voice service. For instance, a generic wake-word not corresponding to a specific voice service might be used to invoke processing of the voice input (e.g., "Hey, Sonos").

In such cases, the NMD may identify a default voice service to process the voice input based on context. A default voice service may be pre-determined (e.g., configured during a set-up procedure, such as the example procedures described above). Then, when the NMD determines that the received voice data excludes any wake-word corresponding to a specific voice service (e.g., the NMD does not detect a wake-word corresponding to the specific voice service in the voice data), the NMD may select the default voice service to process the voice input.

As noted above, some example systems may include multiple NMDs, possibly configured into multiple zones (e.g., media playback system 100 of FIG. 1 with Living Room, Kitchen, Dining Room, and Bedroom zones, each with respective playback devices). In such systems, a default voice service may be configured on a per NMD or per zone basis. Then, voice inputs detected by a given NMD or zone may be processed by the default voice service for that NMD or zone. In some cases, the NMD may assume that a voice input that was detected by a given NMD or zone is intended to be processed by the voice service associated with the zone. However, in other case, a wake-word or phrase may direct the voice input to a particular NMD or zone (e.g., "Hey, Kitchen" to direct a voice input to a Kitchen zone).

To illustrate, referring to FIG. 1, playback devices 122 and/or 124 may operate as NMDs of the Master Bedroom zone. A voice input detected by and/or directed to this zone (e.g., "Hey, Master Bedroom, what's the weather today?") may be processed by the default voice service for the Master Bedroom zone. For instance, if the default voice service for the Master Bedroom zone is "AMAZON® Alexa®", then at least one of the NMDs of the Master Bedroom zone will query Alexa for the weather. Where a voice input includes a wake-word or phrase corresponding to a specific voice service, the wake-word or phrase may override the default voice service (if the specific voice service is different from the default voice service) and cause the NMD to identify the specific voice service to process the voice input.

In some implementations, the NMD may identify the voice service based on the identity of the user providing the voice input. Human voices can vary by pitch, timbre, and other qualities, which may provide characteristics by which to identify a particular user by their voice. In some cases, users in a household may train a NMD to recognize their respective voices.

Each user in a household may have their own preferred voice service. For instance, a first user and a second user in a household may configure the NMD to use a first and second voice service, respectively (e.g., SIRI® and CORTANA®). If the NMD recognizes the first user's voice in the voice input, then the NMD may identify the first voice service to process the voice command. However, if the NMD recognizes the second user's voice in the voice input, then the NMD may instead identify the second voice service to process the voice command.

Alternatively, the NMD may identify a particular voice service to process the voice input based on context. For instance, the NMD may identify a particular voice service based on the type of command. An NMD (e.g., a NMD that is associated with a media playback system) may recognize certain commands (e.g., play, pause, skip forward, etc.) as being a particular type of command (e.g., media playback commands). In such cases, when the NMD determines that the voice input includes a particular type of command (e.g., a media playback command), the NMD may identify, as the voice service to process that voice input, a particular voice service configured to process that type of command. To further illustrate, search queries may be another example type of command (e.g., "what's the weather today?" or "where was David Bowie born?"). When the NMD determines that a voice input includes a search query, the NMD may identify a particular voice service (e.g., "GOOGLE") to process that voice inputs that includes the search.

In some cases, the NMD may determine that the voice input includes a voice command that is directed to a particular type of device. In such cases, the NMD may identify a particular voice service that is configured to process voice inputs directed to that type of device to process the voice input. For example, the NMD may determine that a given voice input is directed to one or more wireless illumination devices (e.g., that "Turn on the lights in here" is directed to the "smart" lightbulbs in the same room as the NMD) and identify, as the voice service to process the voice input, a particular voice service that is configured to process voice inputs directed to wireless illumination devices. As another example, the NMD may determine that a given voice input is directed to a playback device and identify, as the voice service to process the voice input, a particular voice service that is configured to process voice inputs directed to playback devices.

Within examples, the NMD may identify the particular voice service to process the voice input based on a previous input. A user might expect that if a first voice input was processing by a given voice service, then a second subsequent voice input will also be processed by that voice service if the second voice input is directed to the same device, of the same type, or provided shortly after the first command, among other possible contextual factors. For instance, the NMD may determine that a previous voice input was processed by a given voice service and that the present voice input is directed to the same type of operation as the previous voice input (e.g., both are media playback commands). In such a situation, the NMD may identify that voice service to process the present voice input.

As another example, the NMD may determine that a previous voice input was processed by a given voice service and that the present voice input was received within a threshold period of time after the previous voice input was received (e.g., within 1-2 minutes). To illustrate, playback device 114 may receive a first voice input ("Hey Kitchen, play Janis Joplin") and identify a voice service to process that first voice input, which my result in playback device 114 playing an audio track by Janis Joplin. Later, playback device 114 may receive a second subsequent voice input ("Turn it up") and identify a voice service to process that second voice input. Given the similarity between the type of commands as media playback commands and/or the duration between the two voice inputs, playback device 114 may identify the same voice service to process the second voice input as identified to process the first voice input.

In some cases, the NMD may identify a first voice service to process the voice input, but then determine that the first voice service is unavailable to process the voice input (perhaps by failing to receive results within a certain period of time). A voice service may become unavailable for any number of reasons, such as an expired subscription to the service, a technical issue with the cloud service, or a malicious event affecting availability (e.g., a distributed denial-of-service attack).

In such cases, the NMD may identify a second, alternative voice service to process the voice input. The alternate might be a default voice service. Alternatively, multiple voice services registered to a system may be ranked by priority, and the alternative voice service may be the voice service having the next highest priority. Other examples are possible as well.

In some cases, the NMD may seek input from the user in identifying an alternative voice service. For instance, the NMD may request that the user provide an alternative voice service (e.g., "GOOGLE® is not currently responding, would you like to query an another service?"). Yet further, the NMD may identify an alternative voice service and confirm that the user would like to query this alternative voice service instead (e.g., "SIRI® is not currently responding, would you like to query ALEXA® instead?"). Or, as another example, the NMD may query the alternative voice service and notify the user when returning the results (e.g., "CORTANA® was unavailable, the following results are from SIRI®"). Once the original voice service becomes available, the NMD may inform the user of this change in status and perhaps change the current voice service (e.g., "SIRI® is available now, would you like to query SIRI® instead?"). Such responses may be generated from stored audio data on a data storage of the NMD, or that the NMD can access.

Where a second, alternative voice service is queried, the NMD may attempt to apply one or more settings of the first voice service to the second voice service. For instance, if the query is to play back media content from a particular artist and a default audio service is configured for the first voice service (e.g., a particular streaming media service), the NMD may attempt to query the second voice service for audio tracks by the particular artist from the default audio service. However, if a different setting (e.g., a different default service) is configured for the second voice service, such a setting may override the setting for the first voice service when querying the second voice service.

In some instances, only a single voice service is available to the NMD. For instance, during set-up of a media playback system, a particular voice service may have been selected for the media playback system. In some cases, if a particular voice service is selected, wake-words corresponding to other voice services may be inactive such that detecting these wake-words does not trigger processing. A voice service may include various settings to modify behavior of the voice service when queried with a voice input. For instance, a preferred or default streaming media service may be configured. Media playback voice commands (e.g., "Play Katy Perry") will source media content from that particular music service (e.g., audio tracks by Katy Perry).

c. Cause Identified Voice Service(s) to Process the Voice Input

At block 706, implementation 700 involves causing the identified voice service(s) to process the voice input. For instance, the NMD may transmit, via a network interface to one or more servers of the identified voice service(s), data representing the voice input and a command or query to process the data presenting the voice input. The command or query may cause the identified voice service(s) to process the voice command. The command or query may vary according to the identified voice service so as to conform the command or query to the identified voice service (e.g., to an API of the voice service).

As noted above, the voice data may indicate a voice input, which may in turn include a first portion representing a wake-word and a second portion representing a voice command. In some cases, the NMD may transmit only the data representing at least the second portion of the voice input (e.g., the portion representing the voice command). By excluding the first portion, the NMD may reduce bandwidth needed to transmit the command and avoid possible mis-processing of the voice input due to the wake-word, among other possible benefits. Alternatively, the NMD may transmit data representing both portions of the voice input, or some other portion of the voice data.

After causing the identified voice service to process the voice input, the NMD may receive results of the processing. For instance, if the voice input represented a search query, the NMD may receive search results. As another example, if the voice input represented a command to a device (e.g., a media playback command to a playback device), the NMD may receive the command and perhaps additional data associated with the command (e.g., a source of media associated with the command). The NMD may output these results as appropriate to the type of command and the received results.

Alternatively, if the voice command was directed to another device other than the NMD, the results might be directed to that device rather than to the NMD. For instance, referring to FIG. 1, playback device 114 in the Kitchen zone may receive a voice input that was directed to playback device 112 of the Dining Room zone (e.g., to adjust media playback by playback device 112). In such an embodiment, although playback device 114 facilitates processing of the voice input, the results of the processing (e.g., a command to adjust media playback may be sent to playback device 112). Alternatively, the voice service may send the results to playback device 114, which may relay the command to playback device 112 or otherwise cause playback device 112 to carry out the command.

While the NMD may cause the identified voice service to process some voice inputs, other voice inputs may be processed by the NMD itself. For instance, where the NMD is a playback device, control device, or other device of a media playback system, the NMD may include voice recognition of media playback commands. As another example, the NMD may process the wake-word portion of a voice input. In some instances, processing by the NMD may provide a faster response time than processing using a voice service. However, in some cases, processing using a voice service might provide better results and/or results not available when processing via the NMD. In some implementations, a voice service associated with the NMD (e.g. operated by the manufacturer of the NMD) may facilitate such voice recognition.

IV. Example Systems and Methods to Invoke Voice Service

As discussed above, in some examples, a computing device may use a voice service to process a voice command. Implementation 800 is an example technique to cause a voice service to process a voice input.

a. Receive Voice Data Indicating a Voice Input

At block 802, implementation 800 involves receiving voice data indicating a voice input. For instance, a NMD may receive, via a microphone, voice data indicating a voice input using any of the example techniques described above in connection with block 702 of implementation 700, among other possible implementations.

b. Determine that the Received Voice Data Includes a Portion Representing a Generic Wake-Word At block 804, implementation 800 involves determining that the received voice data includes a portion representing a generic wake-word. A generic wake word might not correspond to a specific voice service. Instead, a generic wake-word may correspond to a NMD or media playback system generally (e.g., "Hey, Sonos" for a SONOS® media playback system or "Hey, Kitchen" for the Kitchen zone of a media playback system). Being generic, the generic wake word may be assumed not to invoke a particular voice service. Rather, if multiple voice services are registered, then the generic wake-word may be assumed to invoke all of the voice services to obtain the best results. Alternatively, if a single voice service is registered, then the generic wake-word may be assumed to invoke that voice service.

c. Cause Voice Service(s) to Process the Voice Input

At block 806, implementation 800 involves causing one or more voice service(s) to process the voice input. For instance, a NMD may cause voice service(s) to process the voice input using any of the example techniques described above in connection with block 706 of implementation 700, among other possible implementations.

In some cases, multiple voice services are available to the NMD. For instance, multiple voice services are registered with a media playback system that is associated with the NMD. In such examples, the NMD may cause each of the available voice services to process the voice input. For instance, the NMD may transmit, via a network interface to respective servers of the multiple voice service(s), data representing the voice input and a command or query to process the data presenting the voice input. The command or query may cause the identified voice service(s) to process the voice command. The command or query may vary according to each voice service so as to conform the command or query to that voice service (e.g., to an API of the voice service).

After causing the voice service(s) to process the voice input, the NMD may receive results of the processing. For instance, if the voice input represented a search query or a media playback command, the NMD may receive search results or a command, respectively. The NMD may receive results from each voice service or a subset of the voice services. Some voice services might not return results for every possible input.

d. Output Results from a Particular Voice Service of the Voice Service(s)

At block 806, implementation 800 involves outputting results from a particular voice service of the voice service(s). If only results from one voice services are received, the NMD may output those results. However, if results from multiple voice services are received, the NMD may select particular results from among the respective results from the multiple voice services and output those results.

To illustrate, in one example, a NMD may receive a voice input of "Hey Kitchen, play Taylor Swift." The NMD may determine that the wake-word portion of the voice input ("Hey, Kitchen") is generic in that it does not indicate a particular voice service. Given this type of wake-word, the NMD may cause multiple voice services to process the voice input. However, if the wake-word portion of the voice input included a wake word corresponding to a particular voice service (e.g., "Hey, Siri"), the NMD might instead cause only the corresponding voice service to process the voice input.

After causing the multiple voice services to process the voice input, the NMD may receive respective results from the multiple voice services. For instance, with the voice command "play Taylor Swift," the NMD may receive Taylor Swift audio tracks from a first voice service (e.g., ALEXA®) and search results related to Taylor Swift from a second voice service (e.g., GOOGLE®). Since the command was to “play” Taylor Swift, the NMD may select the audio tracks from the first voice service over the search results from the second voice service. The NMD may output these results by causing the Kitchen zone to start playing the audio tracks.

In another example, the voice services included in the processing might be specific to a particular type of command. For instance, a streaming media service (e.g., SPOTIFY®) might have a voice service component for audio playback related commands. In an example, a NMD may receive a voice input of “what's the weather?.” For this input, the voice service of a streaming media service might not return useful results (e.g., a null or error results). The NMD might select results from another voice service.

V. Example Systems and Methods to Register Voice Services

As discussed above, in some examples, a computing device may register one or more voice services to process a voice command. Implementation 900 is an example technique to cause a NMD to register at least one voice service.

a. Receive Input Data Indicating a Command to Register Voice Service(s)

At block 902, implementation 900 involves receiving input data indicating a command to register one or more voice services on one or more second devices. For instance, a first device (e.g., a NMD) may receive, via a user interface (e.g., a touchscreen), input data indicating a command to register one or more voice services with a media playback system that includes one or more playback devices. In one example, the NMD receives the input as part of a procedure to set-up the media playback system using any of the example techniques described above in connection with block 702 of implementation 700, among other possible implementations.

b. Detect Voice Services that are Registered to NMD

At block 904, implementation 900 involves detecting one or more voice services that are registered to the first device (e.g., the NMD). Such voice services may include voice services that are installed on the NMD or that are native to the NMD (e.g., part of the operating system of the NMD).

For instance, a NMD that is a smartphone or tablet may have installed one or more applications (“apps”) that interface with voice services. The NMD may detect these applications using any suitable technique. Techniques may vary by manufacturer or operating system of the NMD. In one example, the NMD may compare a list or database of installed applications with a list of supported voice services to determine which supported voice services are installed on the NMD.

In other examples, a voice service may be native to the NMD. For instance, voice services from APPLE® and GOOGLE® may be integrated into or pre-installed on devices running the iOS and Android operating systems respectively. Further, some customized distributions of these operating systems (e.g., FireOS® from AMAZON®) may include a native voice service (e.g., ALEXA®).

c. Cause Registration of Detected Voice Service(s) on Devices

At block 906, implementation 900 involves causing registration of at least one of the detected voice services to be registered on the one or more second devices. For instance, the NMD may cause at least one of the detected voice services to be registered with a media playback system that includes one or more playback devices (e.g., media playback system 100 of FIG. 1). Causing the a voice service to be registered may involve transmitting, via a network interface, a message indicating credentials for that voice service to the media playback system (i.e., at least one device thereof). The message may also include a command, request, or other query to cause the media playback system to register with the voice service using the credentials from the NMD. In such manner, a user's media playback system may have registered one or more of the same voice services as registered on the user's NMD (e.g., smartphone) utilizing the same credentials as the user's NMD, which may hasten registration. Other benefits are possible as well.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method comprising receiving, via a microphone, voice data indicating a voice input; identifying, from among multiple voice services registered to a media playback system, a voice service to process the voice input; and causing, via a network interface, the identified voice service to process the voice input.

(Feature 2) The method of claim 1, wherein identifying the voice service to process the voice input comprises determining that a portion of the received voice data represents a particular wake-word corresponding to a specific voice service; and identifying, as the voice service to process the voice input, the specific voice service that corresponds to the particular wake-word, wherein each voice service of the multiple voice services registered to the media playback system corresponds to a respective wake-word.

(Feature 3) The method of claim 2, wherein determining that the portion of the received voice data represents the particular wake-word corresponding to the specific voice service comprises querying wake-word detection algorithms corresponding to each voice service of the multiple voice services with the received voice data and determining that a wake-word detection algorithm of the specific voice service detected that the portion of the received voice data represents the particular wake-word corresponding to the specific voice service.

(Feature 4) The method of claim 1, wherein identifying the voice service to process the voice input comprises determining that the received voice data excludes any wake-word corresponding to a given voice service of the multiple voice services registered to the media playback system and based on the determination, identifying, as the voice service to process the voice input, a default voice service of the multiple voice services.

(Feature 5) The method of claim 1, wherein identifying the voice service to process the voice input comprises determining that (i) a previous voice input was processed by a particular voice service and (ii) the voice input was received within a threshold period of time after the previous voice input was received and based on the determination, identifying, as the voice service to process the voice input, the particular voice service that processed the previous voice input.

(Feature 6) The method of claim 1, wherein identifying the voice service to process the voice input comprises determining that (i) a previous voice input was processed by a particular voice service and (ii) the voice input is directed to the same type of operation as the previous voice input and based on the determination, identifying, as the voice service to process the voice input, the particular voice service that processed the previous voice input.

(Feature 7) The method of claim 1, wherein identifying the voice service to process the voice input comprises determining that the voice input includes a media playback command and based on the determination, identifying, as the voice service to process the voice input, a particular voice service that is configured to process media playback commands.

(Feature 8) The method of claim 1, wherein identifying the voice service to process the voice input comprises determining that the voice input is directed to wireless illumination devices and based on the determination, identifying, as the voice service to process the voice input, a particular voice service that is configured to process voice inputs directed to wireless illumination devices.

(Feature 9) The method of claim 1, wherein identifying the voice service to process the voice input comprises determining that a portion of the received voice data represents a generic wake-word that does not correspond to any particular voice service and based on the determination, identifying, as the voice service to process the voice input, a default voice service of the multiple voice services.

(Feature 10) The method of claim 1, wherein the media playback system comprises multiple zones, and wherein identifying the voice service to process the voice input comprises determining that the voice input was directed to a particular zone of the multiples zones and based on the determination, identifying, as the voice service to process the voice input, a particular voice service that is configured to process voice inputs directed to the particular zone of the media playback system.

(Feature 11) The method of claim 1, wherein identifying the voice service to process the voice input comprises determining that a portion of the received voice data represents a particular wake-word corresponding to a first voice service, determining that the first voice service is currently unavailable to process the voice input, and identifying, as the voice service to process the voice input, a second voice service that is different from the first voice service.

(Feature 12) The method of claim 1, wherein the voice input comprises a first portion representing a wake-word and a second portion representing a voice command, and wherein causing the identified voice service to process the voice input comprises transmitting, via the network interface to one or more servers of the identified voice service, (i) data representing at least the second portion of the voice input and (ii) a command to process the data representing the voice command.

(Feature 13) A tangible, non-transitory computer-readable medium having stored therein instructions executable by one or more processors to cause a device to perform the method of any of features 1-12.

(Feature 14) A device configured to perform the method of any of features 1-12.

(Feature 15) A media playback system configured to perform the method of any of features 1-12.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A playback device comprising:

one or more amplifiers configured to drive one or more speakers;

at least one microphone;

a network interface;

one or more processors; and data storage having stored therein instructions executable by the one or more processors to cause the playback device to perform a method comprising:

registering the playback device with a first voice assistant service;

after registering the playback device with the first voice assistant service, receiving from a computing device, an instruction to register the playback device with a second voice assistant service;

after receiving the instruction to register the playback device with the second voice assistant service, registering the playback device with the second voice assistant service such that the playback device is concurrently registered to the first and second voice assistant services;

continuously capturing, via the at least one microphone, audio into one or more buffers;

analyzing the captured audio using a first wake-word detection algorithm and a second wake-word detection algorithm, wherein the first wake-word detection algorithm corresponds to a first wake word associated with the first voice assistant service, and wherein the second wake-word detection algorithm corresponds to a second wake word associated with the second voice assistant service;

when one of the first wake-word detection algorithm and the second wake-word detection algorithm detects, in the captured audio, a wake word corresponding to a particular voice assistant service of (a) the first voice assistant service or (b) the second voice assistant service, transmitting the captured audio to one or more servers associated with the particular voice assistant service;

after transmitting the captured audio, receiving, via the network interface, at least one instruction based on the captured audio; and after receiving the at least one instruction, performing one or more actions based on the at least one instruction.

2. The playback device of claim 1, wherein the method further comprises:

assigning the first voice assistant service as a default voice assistant service;

further capturing, via the at least one microphone, audio into the one or more buffers;

analyzing the further captured audio using the first wake-word detection algorithm and the second wake-word detection algorithm;

detecting, in the further captured audio, the second wake word;

determining that the second voice assistance service is unavailable to process the further captured audio;

after determining that the second voice assistance service is unavailable to process the further captured audio, transmitting the further captured audio to one or more servers associated with the default voice assistant service;

after transmitting the further captured audio, receiving from the default voice assistant service, via the network interface, at least one instruction based on the further captured audio; and after receiving the at least one instruction from the default voice assistant service, performing one or more actions based on the at least one instruction from the default voice assistant service.

3. The playback device of claim 1, wherein receiving from the computing device an instruction to register the playback device with the second voice assistant service comprises receiving the instruction from a remote computing device associated with the second voice assistant service.

4. The playback device of claim 1, wherein performing the one or more actions comprises receiving audio via the network interface and playing back the received audio via the one or more amplifiers configured to drive the one or more speakers.

5. The playback device of claim 4, wherein the particular voice assistant service comprises the first voice assistant service, and wherein the method further comprises:

further capturing, via the at least one microphone, audio into the one or more buffers;

analyzing the further captured audio using the first wake-word detection algorithm and the second wake-word detection algorithm;

detecting, via the second wake-word detection algorithm, the second wake word in the further captured audio data;

after detecting the second wake word, transmitting the further captured audio to one or more servers associated with the second voice assistant service, wherein the further captured audio comprises a query;

receiving, via the network interface in response to the query, data corresponding to results of the query; and playing back audio based on the data via the one or more amplifiers configured to drive the one or more speakers.

6. The playback device of claim 1, wherein performing the one or more actions comprise modifying at least one playback setting of a media playback system, wherein the media playback system comprises the playback device.

7. The playback device of claim 6, wherein the particular voice assistant service comprises the first voice assistant service, and wherein the method further comprises:

further capturing, via the at least one microphone, audio into the one or more buffers;

analyzing the further captured audio using the first wake-word detection algorithm and the second wake-word detection algorithm;

detecting, via the second wake-word detection algorithm, the second wake word in the further captured audio data;

after detecting the second wake word, transmitting the further captured audio to one or more servers associated with the second voice assistant service, wherein the further captured audio comprises a voice command to play particular audio;

receiving, via the network interface in response to the voice command, instructions to play back at least one audio track; and after receiving the instructions to play back the at least one audio track, playing back the at least audio track via the one or more amplifiers configured to drive the one or more speakers.

8. A method to be performed by a playback device comprising a network interface, at least one microphone, and one or more amplifiers configured to drive one or more speakers, the method comprising:

registering the playback device with a first voice assistant service;

after registering the playback device with the first voice assistant service, receiving from a computing device an instruction to register the playback device with a second voice assistant service;

after receiving the instruction to register the playback device with the second voice assistant service, registering the playback device with the second voice assistant service such that the playback device is concurrently registered to the first and second voice assistant services;

continuously capturing, via the at least one microphone, audio into one or more buffers;

analyzing the captured audio using a first wake-word detection algorithm and a second wake-word detection algorithm, wherein the first wake-word detection algorithm corresponds to a first wake word associated with the first voice assistant service, and wherein the second wake-word detection algorithm corresponds to a second wake word associated with the second voice assistant service;

when one of the first wake-word detection algorithm and the second wake-word detection algorithm detects, in the captured audio, a wake word corresponding to a particular voice assistant service of (a) the first voice assistant service or (b) the second voice assistant service, transmitting the captured audio to one or more servers associated with the particular voice assistant service;

after transmitting the captured audio, receiving, via the network interface, at least one instruction based on the captured audio; and after receiving the at least one instruction, performing one or more actions based on the at least one instruction.

9. The method of claim 8, further comprising:
assigning the first voice assistant service as a default voice assistant service;
further capturing, via the at least one microphone, audio into the one or more buffers;
analyzing the further captured audio using the first wake-word detection algorithm and the second wake-word detection algorithm;
detecting, in the further captured audio, the second wake word;
determining that the second voice assistance service is unavailable to process the further captured audio;
after determining that the second voice assistance service is unavailable to process the further captured audio, transmitting the further captured audio to one or more servers associated with the default voice assistant service;
after transmitting the further captured audio, receiving, from the one or more servers of the default voice assistant service via the network interface, at least one instruction based on the further captured audio; and
after receiving the at least one instruction from the default voice assistant service, performing one or more actions based on the at least one instruction from the default voice assistant service.

10. The method of claim 8, wherein receiving from the computing device an instruction to register the playback device with the second voice assistant service comprises receiving the instruction from a remote computing device associated with the second voice assistant service.

11. The method of claim 8, wherein performing the one or more actions comprises receiving audio via the network interface and playing back the received audio via the one or more amplifiers configured to drive the one or more speakers.

12. The method of claim 11, wherein the particular voice assistant service comprises the first voice assistant service, and wherein the method further comprises:
further capturing, via the at least one microphone, audio into the one or more buffers;
analyzing the further captured audio using the first wake-word detection algorithm and the second wake-word detection algorithm;
detecting, via the second wake-word detection algorithm, the second wake word in the further captured audio data;
after detecting the second wake word, transmitting the further captured audio to one or more servers associated with the second voice assistant service, wherein the further captured audio comprises a query;
receiving, via the network interface in response to the query, data corresponding to results of the query; and
playing back audio based on the data via the one or more amplifiers configured to drive the one or more speakers.

13. The method of claim 8, wherein performing the one or more actions comprise modifying at least one playback setting of a media playback system, wherein the media playback system comprises the playback device.

14. The method of claim 13, wherein the particular voice assistant service comprises the first voice assistant service, and wherein the method further comprises:
further capturing, via the at least one microphone, audio into the one or more buffers;
analyzing the further captured audio using the first wake-word detection algorithm and the second wake-word detection algorithm;
detecting, via the second wake-word detection algorithm, the second wake word in the further captured audio data;
after detecting the second wake word, transmitting the further captured audio to one or more servers associated with the second voice assistant service, wherein the further captured audio comprises a voice command to play particular audio;
receiving, via the network interface in response to the voice command, instructions to play back at least one audio track; and
after receiving the instructions to play back the at least one audio track, playing back the at least audio track via the one or more amplifiers configured to drive the one or more speakers.

15. A non-transitory computer-readable medium having instructions stored thereon that are executable by one or more processors to cause a playback device to perform a method, the playback device comprising a network interface, at least one microphone, and one or more amplifiers configured to drive one or more speakers, the method comprising:
registering the playback device with a first voice assistant service;
after registering the playback device with the first voice assistant service, receiving from a computing device an instruction to register the playback device with a second voice assistant service;
after receiving the instruction to register the playback device with the second voice assistant service, registering the playback device with the second voice assistant service such that the playback device is concurrently registered to the first and second voice assistant services;
continuously capturing, via the at least one microphone, audio into one or more buffers;
analyzing the captured audio using a first wake-word detection algorithm and a second wake-word detection algorithm, wherein the first wake-word detection algorithm corresponds to a first wake word associated with the first voice assistant service, and wherein the second wake-word detection algorithm corresponds to a second wake word associated with the second voice assistant service;
when one of the first wake-word detection algorithm and the second wake-word detection algorithm detects, in the captured audio, a wake word corresponding to a particular voice assistant service of (a) the first voice assistant service or (b) the second voice assistant service, transmitting the captured audio to one or more servers associated with the particular voice assistant service;
after transmitting the captured audio, receiving, via the network interface, at least one instruction based on the captured audio; and
after receiving the at least one instruction, performing one or more actions based on the at least one instruction.

16. The non-transitory computer-readable medium of claim 15, wherein the method further comprises:
assigning the first voice assistant service as a default voice assistant service;
further capturing, via the at least one microphone, audio into the one or more buffers;
analyzing the further captured audio using the first wake-word detection algorithm and the second wake-word detection algorithm;

detecting, in the further captured audio, the second wake word;

determining that the second voice assistance service is unavailable to process the further captured audio;

after determining that the second voice assistance service is unavailable to process the further captured audio, transmitting the further captured audio to one or more servers associated with the default voice assistant service;

after transmitting the further captured audio, receiving from the default voice assistant service, via the network interface, at least one instruction based on the further captured audio; and after receiving the at least one instruction from the default voice assistant service, performing one or more actions based on the at least one instruction from the default voice assistant service.

17. The non-transitory computer-readable medium of claim 15, wherein receiving from the computing device an instruction to register the playback device with the second voice assistant service comprises receiving the instruction from a remote computing device associated with the second voice assistant service.

18. The non-transitory computer-readable medium of claim 15, wherein performing the one or more actions comprises receiving audio via the network interface and playing back the received audio via the one or more amplifiers configured to drive the one or more speakers.

19. The non-transitory computer-readable medium of claim 18, wherein the particular voice assistant service comprises the first voice assistant service, and wherein the method further comprises:

further capturing, via the at least one microphone, audio into the one or more buffers;

analyzing the further captured audio using the first wake-word detection algorithm and the second wake-word detection algorithm;

detecting, via the second wake-word detection algorithm, the second wake word in the further captured audio data;

after detecting the second wake word, transmitting the further captured audio to one or more servers associated with the second voice assistant service, wherein the further captured audio comprises a query;

receiving, via the network interface in response to the query, data corresponding to results of the query; and playing back audio based on the data via the one or more amplifiers configured to drive the one or more speakers.

20. The non-transitory computer-readable medium of claim 15, wherein performing the one or more actions comprise modifying at least one playback setting of a media playback system, wherein the media playback system comprises the playback device, wherein the particular voice assistant service comprises the first voice assistant service, and wherein the method further comprises:

further capturing, via the at least one microphone, audio into the one or more buffers;

analyzing the further captured audio using the first wake-word detection algorithm and the second wake-word detection algorithm;

detecting, via the second wake-word detection algorithm, the second wake word in the further captured audio data;

after detecting the second wake word, transmitting the further captured audio to one or more servers associated with the second voice assistant service, wherein the further captured audio comprises a voice command to play particular audio;

receiving, via the network interface in response to the voice command, instructions to play back at least one audio track; and after receiving the instructions to play back the at least one audio track, playing back the at least audio track via the one or more amplifiers configured to drive the one or more speakers.

* * * * *